(12) United States Patent
Wince et al.

(10) Patent No.: US 7,488,243 B2
(45) Date of Patent: Feb. 10, 2009

(54) SYSTEMS WITH HORNS THAT EXTEND INTO NETTING CHUTES AND HAVING COOPERATING DERUCKERS FOR PRODUCING ENCASED PRODUCTS AND RELATED DEVICES, METHODS AND COMPUTER PROGRAM PRODUCTS

(75) Inventors: David T. Wince, Fuquay-Varina, NC (US); Thomas E. Whittlesey, Apex, NC (US); Kim L. Poling, Fuquay-Varina, NC (US); William M. Poteat, Fuquay-Varina, NC (US)

(73) Assignee: Tipper Tie, Inc., Apex, NC (US)

( * ) Notice: Subject to any disclaimer, the term of this patent is extended or adjusted under 35 U.S.C. 154(b) by 557 days.

(21) Appl. No.: 11/262,600

(22) Filed: Oct. 31, 2005

(65) Prior Publication Data

US 2006/0105690 A1      May 18, 2006

Related U.S. Application Data

(60) Provisional application No. 60/624,048, filed on Nov. 1, 2004.

(51) Int. Cl.
*A22C 11/00* (2006.01)
(52) U.S. Cl. .................................................. 452/30
(58) Field of Classification Search ................. None
See application file for complete search history.

(56) References Cited

U.S. PATENT DOCUMENTS

| 3,543,378 | A |   | 12/1970 | Klenz |  |
| 3,975,795 | A |   | 8/1976  | Kupcikevicius et al. |  |
| 4,675,945 | A |   | 6/1987  | Evans et al. | 452/48 |
| 4,847,953 | A |   | 7/1989  | Evans et al. | 452/36 |
| 4,958,477 | A | * | 9/1990  | Winkler | 53/138.3 |

(Continued)

FOREIGN PATENT DOCUMENTS

WO   WO2005/044020 A23 L     5/2005

OTHER PUBLICATIONS

Brochure *TCM 2250 Pumpable for muscle pieces*, 2 sheets, 1994 ©.

(Continued)

*Primary Examiner*—Thomas Price
(74) *Attorney, Agent, or Firm*—Myers, Bigel, Sibley & Sajovec, P.A.

(57) ABSTRACT

Apparatus for engaging a filler/product pump that include: (a) a horn having a length, an outer surface and an internal product channel extending therethrough; (b) a forming collar in communication with the horn, wherein, in operation, the forming collar is configured to cooperate with the horn to direct planar casing material to take on a generally tubular shape over an outer surface of the horn while product travels through the internal channel; (c) a netting chute sized and configured to receive a portion of the horn therein, the netting chute configured to hold a sleeve of elastic netting material thereon; and (d) an automated derucker operatively associated with the netting chute whereby the derucker is configured to automatically travel through a derucker stroke cycle comprising upstream and downstream locations to pull segments of netting material toward a downstream end portion of the netting chute while product is pumped out of the horn.

27 Claims, 37 Drawing Sheets

U.S. PATENT DOCUMENTS

| | | | | |
|---|---|---|---|---|
| 5,024,041 | A * | 6/1991 | Urban et al. | 53/449 |
| 5,042,234 | A | 8/1991 | Evans et al. | 53/523 |
| 5,045,020 | A * | 9/1991 | Neeff et al. | 452/21 |
| 5,067,313 | A | 11/1991 | Evans | 53/576 |
| 5,074,386 | A | 12/1991 | Evans | 188/67 |
| 5,085,036 | A | 2/1992 | Evans et al. | 53/550 |
| 5,135,770 | A | 8/1992 | Underwood | 426/271 |
| 5,167,567 | A | 12/1992 | Evans | 452/37 |
| 5,181,302 | A | 1/1993 | Evans | 29/243.56 |
| 5,203,760 | A | 4/1993 | Chen et al. | 493/302 |
| 5,980,374 | A * | 11/1999 | Mercuri | 452/21 |
| 6,401,885 | B1 | 6/2002 | Whittlesey | 188/322.16 |
| 6,439,990 | B1 * | 8/2002 | Kasai et al. | 452/46 |
| 6,666,759 | B2 | 12/2003 | Narcuso | |
| 7,051,415 | B2 * | 5/2006 | Pinto et al. | 29/455.1 |
| 7,063,610 | B2 * | 6/2006 | Mysker | 452/30 |
| 2005/0087075 | A1 | 4/2005 | Mysker | |
| 2005/0101240 | A1 | 5/2005 | Mysker | |

OTHER PUBLICATIONS www.tippertie.com/smoked/tcm2250.asp, 2 sheets, date believed to be before Nov. 1, 2004.

International Search Report and the Written Opinion, date of mailing Oct. 20, 2006 for corresponding PCT application No. PCT/US2005/39293 (9 pages).

* cited by examiner

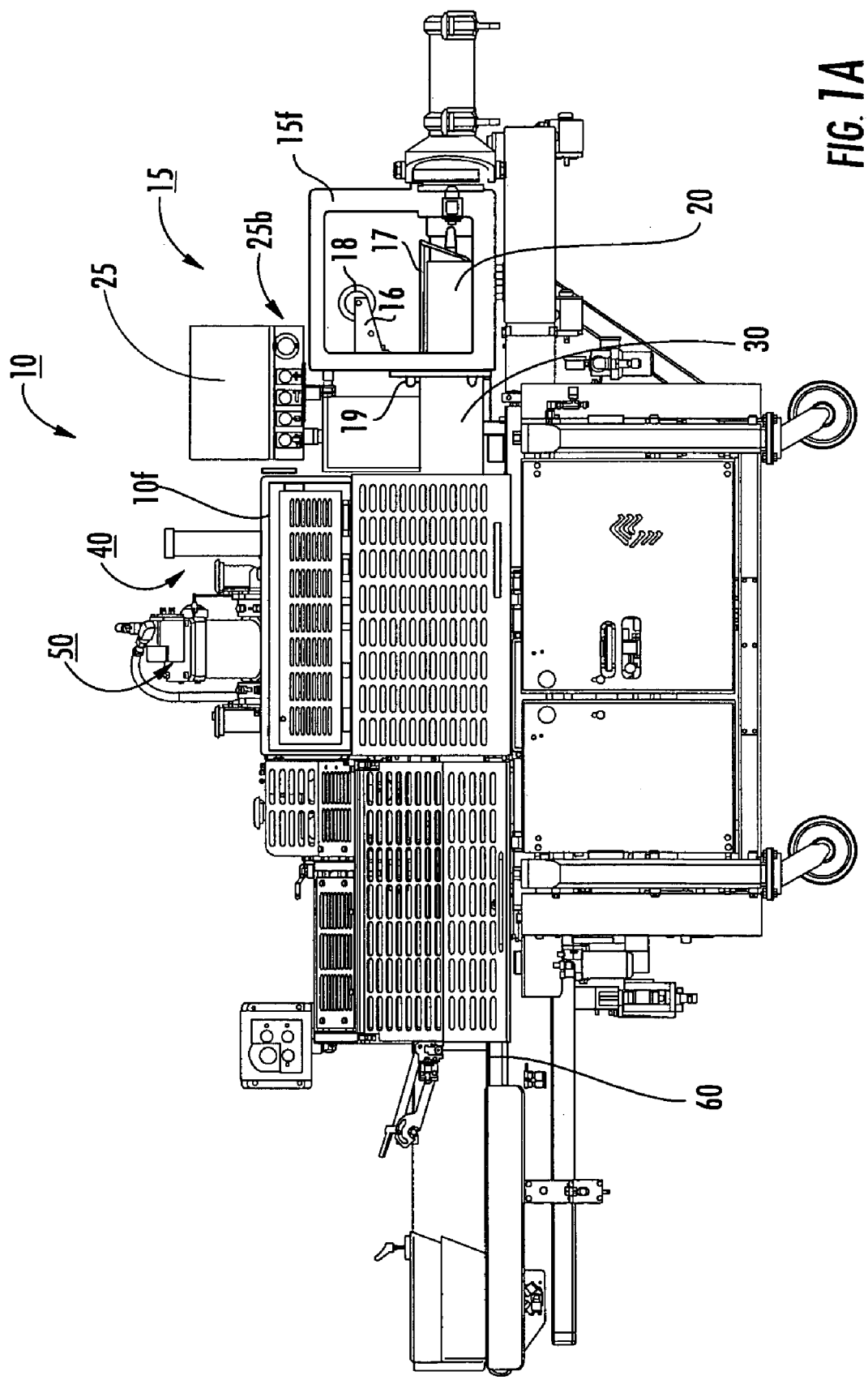

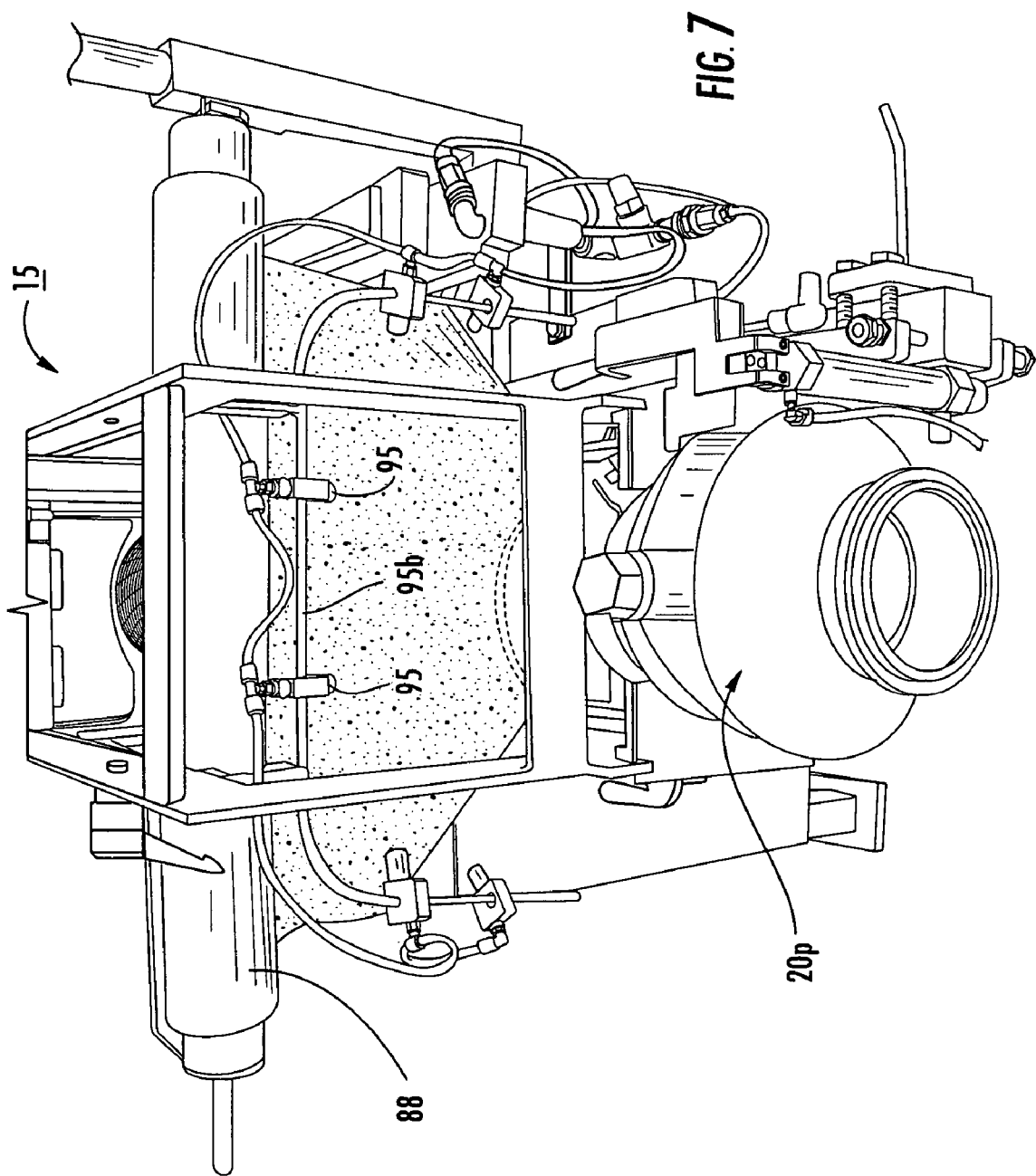

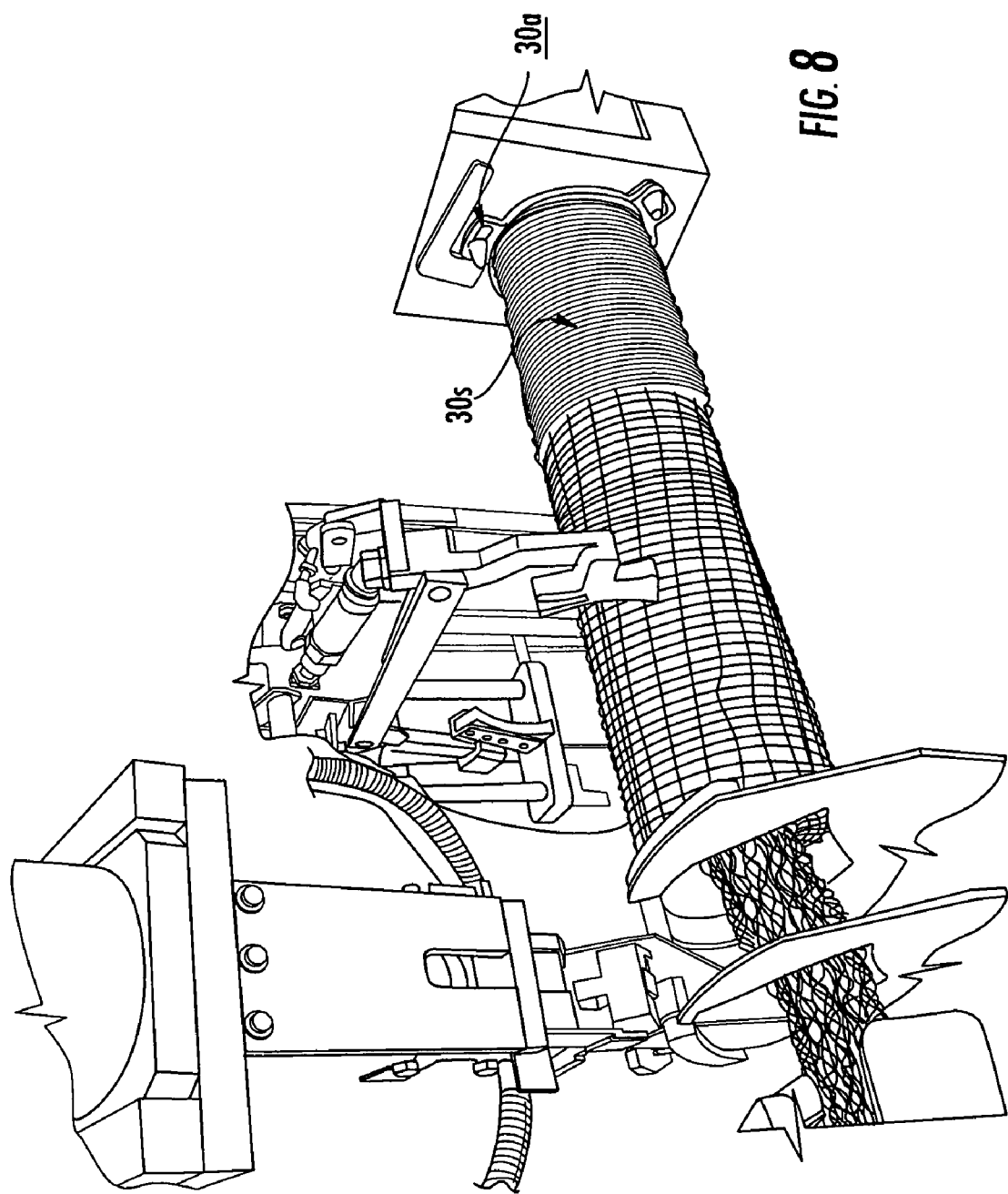

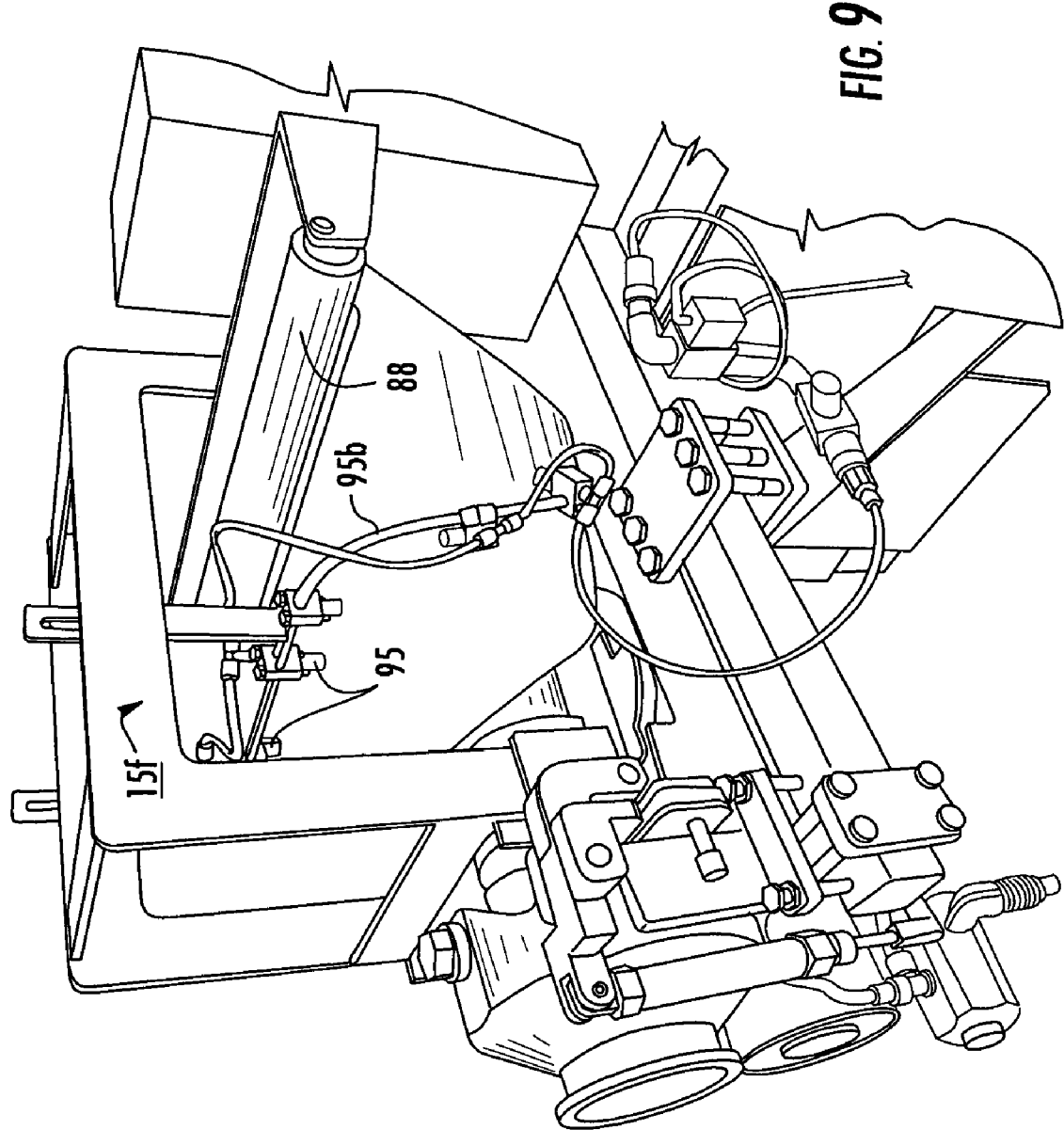

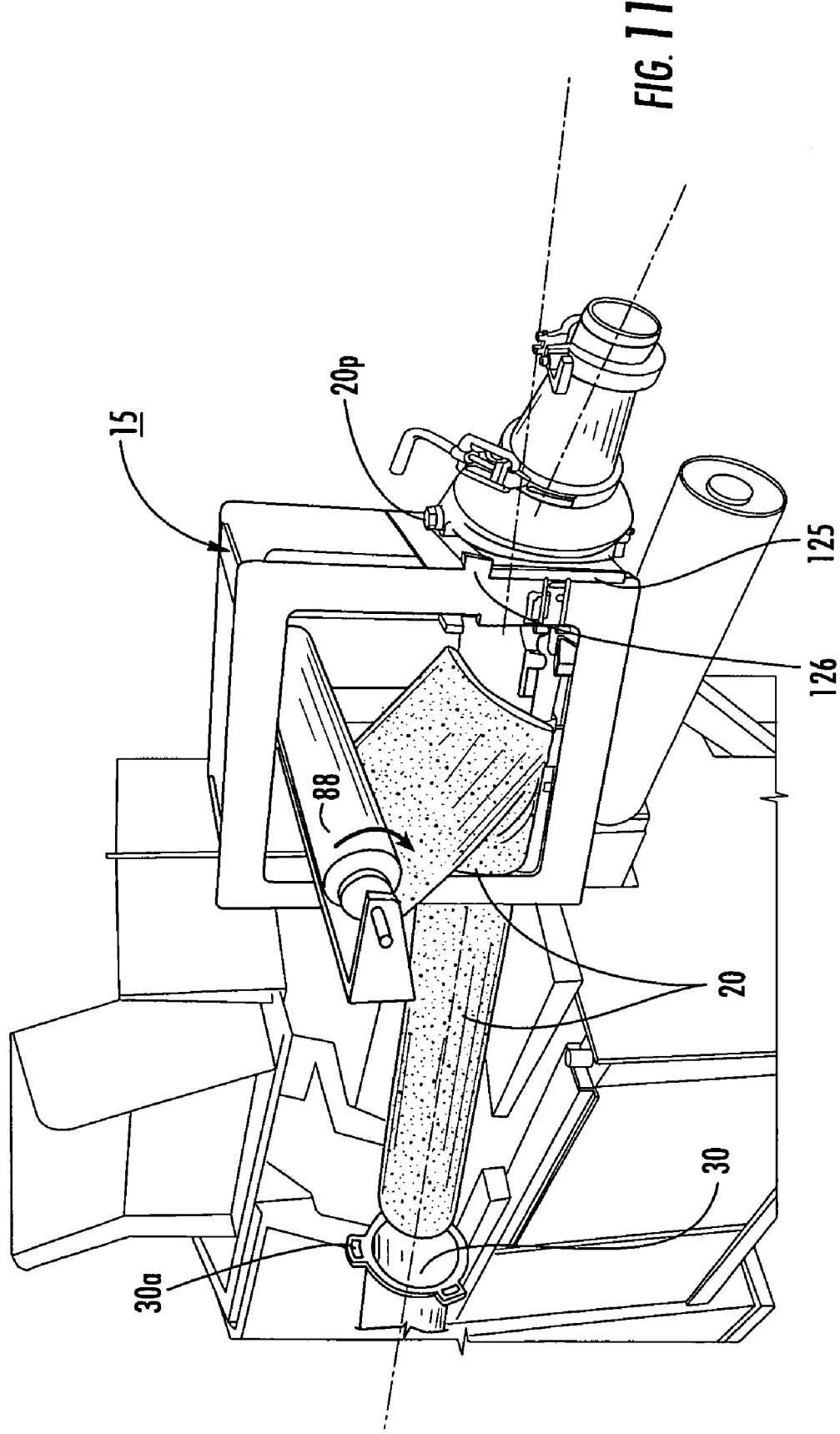

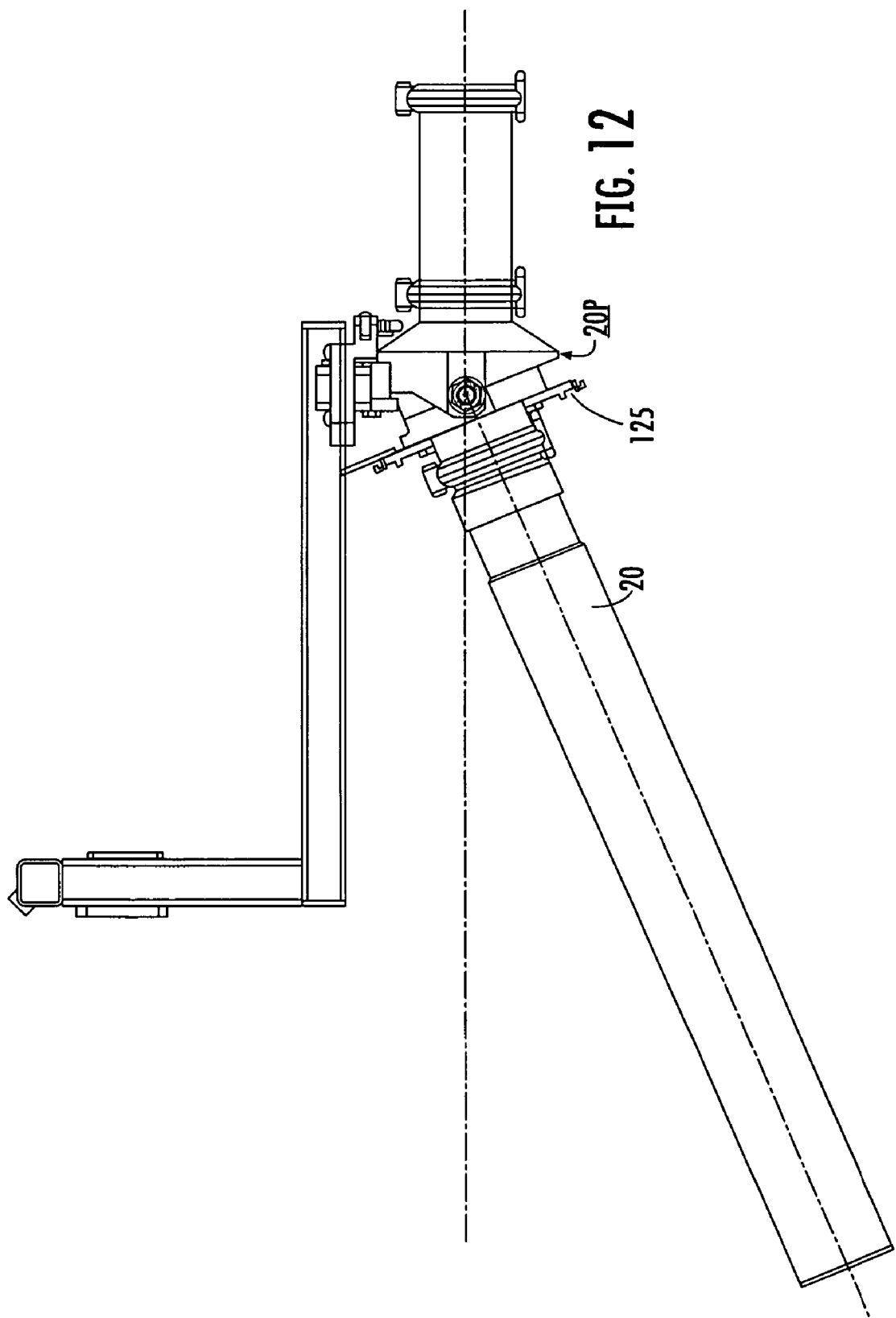

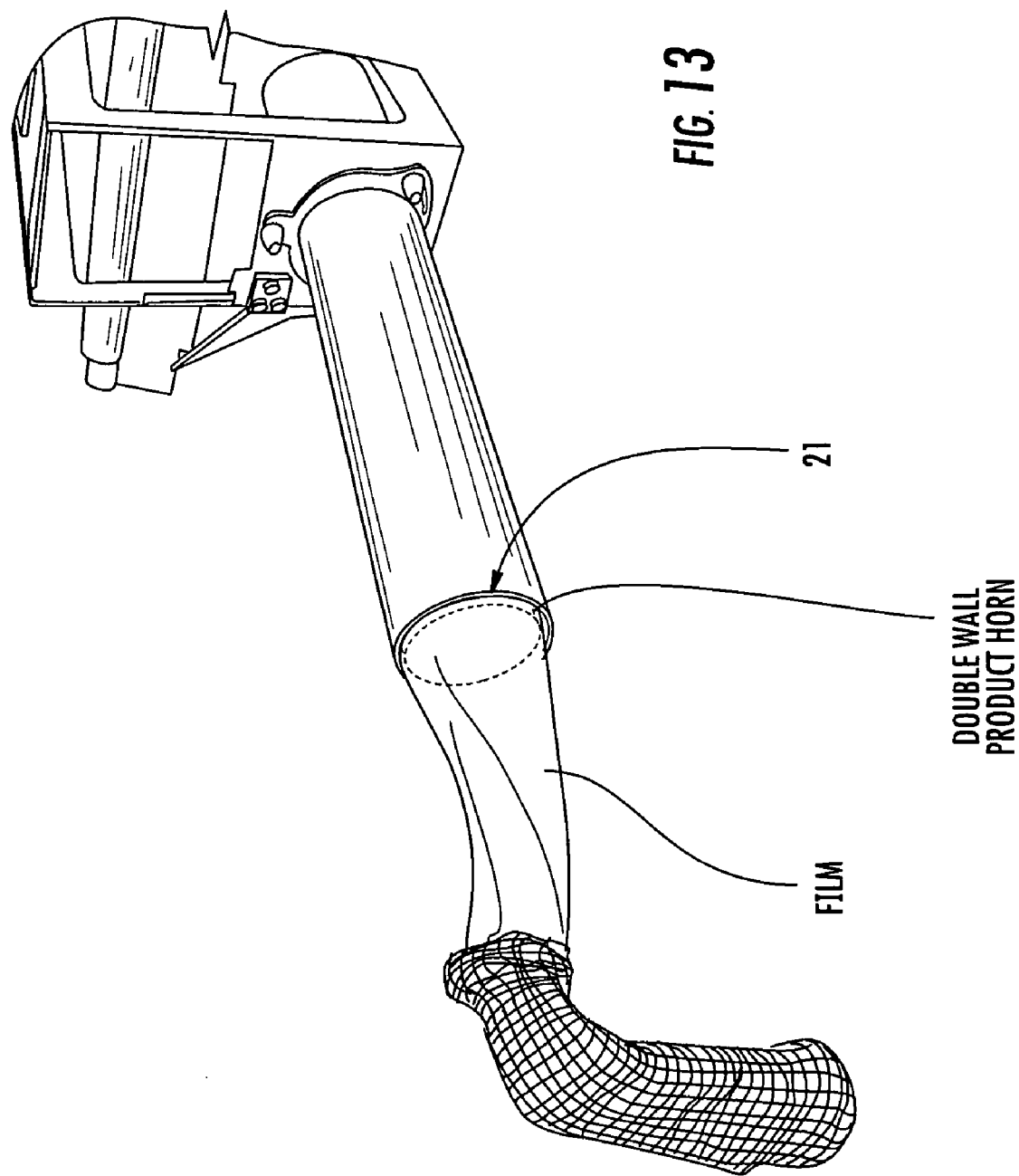

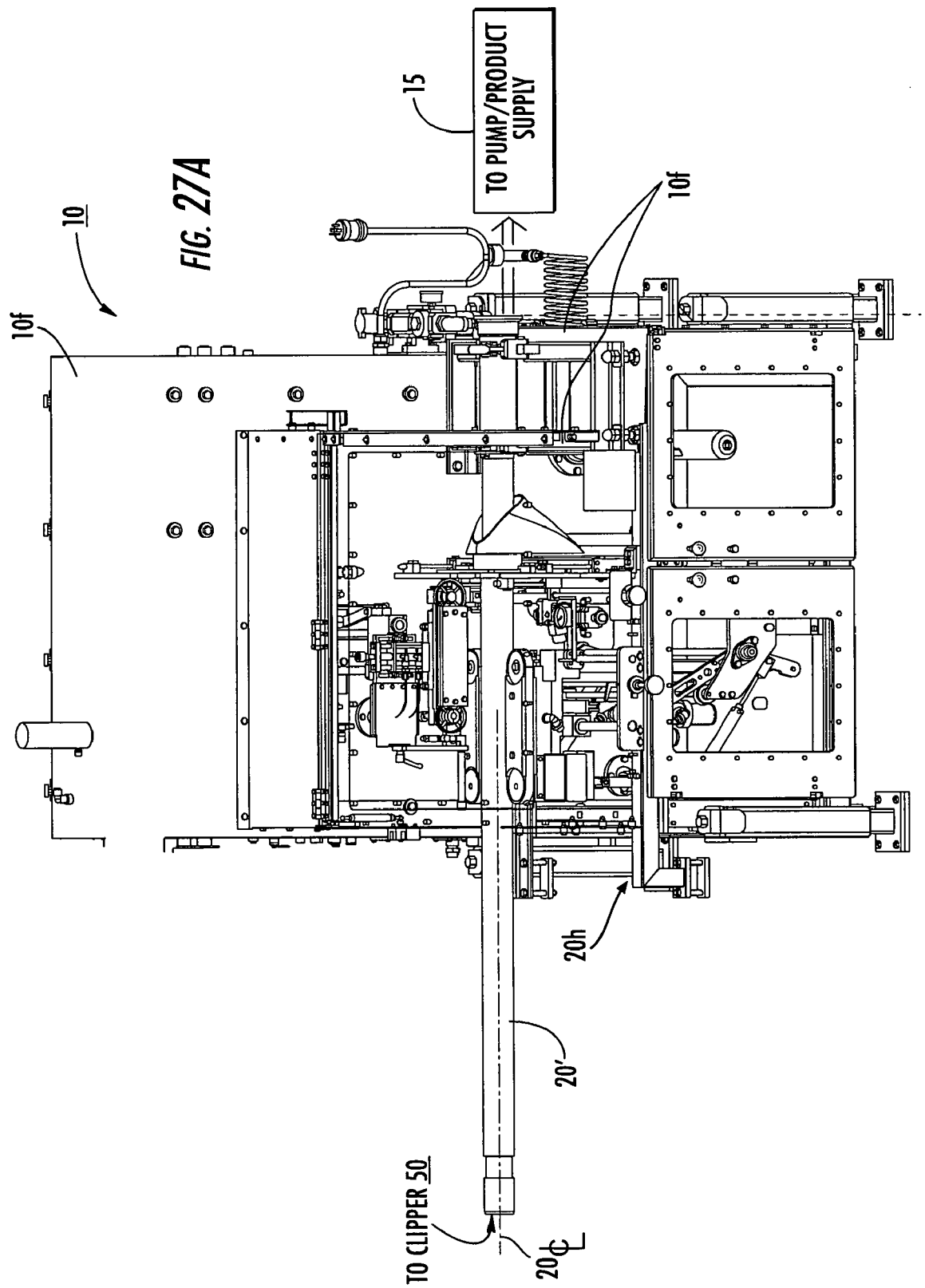

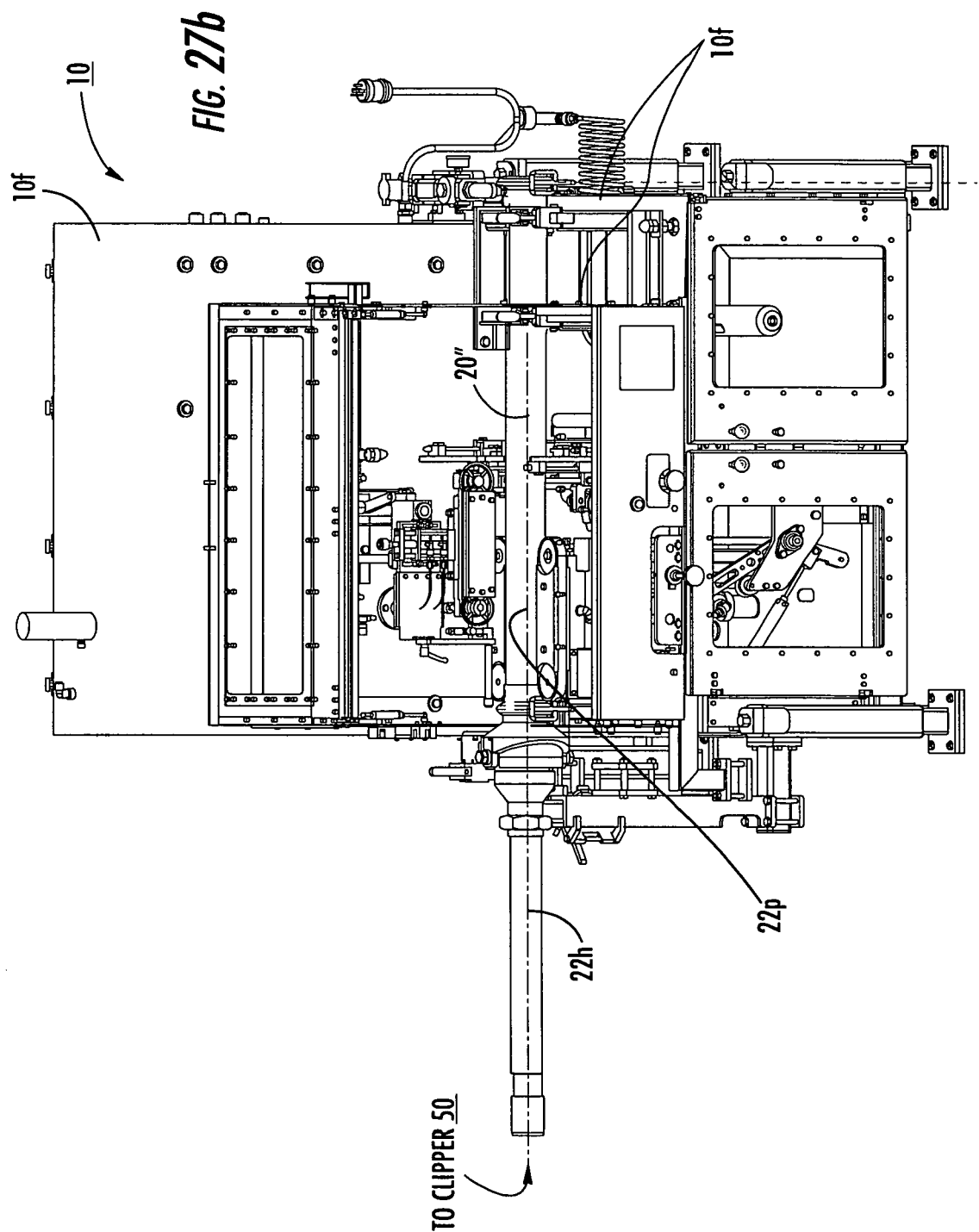

SYSTEMS WITH HORNS THAT EXTEND INTO NETTING CHUTES AND HAVING COOPERATING DERUCKERS FOR PRODUCING ENCASED PRODUCTS AND RELATED DEVICES, METHODS AND COMPUTER PROGRAM PRODUCTS

RELATED APPLICATION

This application claims the benefit of priority of U.S. Provisional Application Ser. No. 60/624,048, filed Nov. 1, 2004, the contents of which are hereby incorporated by reference as if recited in full herein.

FIELD OF THE INVENTION

The present invention relates to apparatus, systems, methods and computer program products that stuff or fill product into casings that enclose products therein. Certain embodiments may be particularly suitable for packaging products in edible film formed into a casing shape in situ and held in netting.

BACKGROUND OF THE INVENTION

It is known to use edible collagen film to cover semi-solid sections of meat during processing to form a smoked meat product that gives the appearance of a solid meat muscle, such as a boneless ham. One example of a known prior art apparatus used to form a smoked meat product is the "TCM2250" pumpable model from Tipper Tie, Inc., located in Apex, N.C.

Generally described, during production of one example of a pumpable smoked meat product, pork muscles are cut into small portions or pieces. The pieces are tumbled together with seasonings and additives such as water and salt. During the tumbling process, protein is exuded from the pieces of meat. The protein becomes a binding agent for the final product. The tumbled semi-solid product is pumped into an edible casing prior to cooking and the protein binds the pieces of meat together so that when cooked the process yields a solid product which can be sold as a boneless ham or sliced product.

Despite the foregoing, there is a desire for alternative automated production apparatus that can provide one or more of increased production capability, reduced footprint or floor requirement, improved automation and/or more product shape control over conventional models.

SUMMARY OF EMBODIMENTS OF THE INVENTION

Embodiments of the present invention provide apparatus, systems, devices, methods and computer program products configured to form casings in situ from (typically edible) flat sheet roll stock into generally tubular casing material and serially enclose quantities of a product in segments of the casing and in segments of netting in an automated or semi-automated manner.

In some particular embodiments, a frame assembly can be configured to selectively mount to an existing pumpable system with the roll stock mounted to reside above the horn and a netting chute mounted to the frame assembly to allow for production of in situ edible casings. In some embodiments, the frame assembly can pivot laterally with a pivoting horn.

Certain embodiments are directed to methods for producing encased products. The methods include: (a) positioning a portion of a generally tubular horn having a product channel therethrough inside a generally tubular netting chute; (b) forming an edible generally flat roll of casing material into a generally tubular casing that extends in an axial direction about the horn; (c) pumping food emulsion through the horn; (d) encasing a desired amount of the food emulsion in a portion of the generally tubular casing material as the food emulsion exits the horn; (e) automatically repetitively drawing short lengths of a sleeve of netting material held on the netting chute forward at a discharge end portion of the netting chute during the pumping step; and (f) enclosing the encased food emulsion in the netting material.

Other embodiments are directed to apparatus that engage a filler/product pump and supplying elongate edible casings for encasing products therein. The apparatus include: (a) a horn having a length, an outer surface and an internal product channel extending therethrough; (b) a forming collar in communication with the horn, wherein, in operation, the forming collar is configured to cooperate with the horn to direct planar casing material to take on a generally tubular shape over an outer surface of the horn while product travels through the internal channel; (c) a netting chute sized and configured to receive a portion of the horn therein, the netting chute configured to hold a sleeve of elastic netting material thereon; and (d) an automated derucker operatively associated with the netting chute whereby the derucker is configured to automatically travel through a derucker stroke cycle comprising upstream and downstream locations to pull segments of netting material toward a downstream end portion of the netting chute while product is pumped out of the horn.

In some embodiments, the apparatus includes an edible roll of casing material that is in communication with the forming collar. The edible roll of casing material can overlap to form a bottom lap seal that is joined by moisture from the product discharged from the horn. In some embodiments, the apparatus can also include a control module, a derucker pressure regulator and a brake pressure regulator, each operatively associated with the derucker. In operation, the control module can control the selective operation of the pressure regulators, the derucker stroke cycle and the derucker brake operation.

In some embodiments, the apparatus can also include a roll support assembly mounted above an upstream portion of the horn. The roll support assembly can include a bar configured to hold a consumable roll of edible casing material and continuously supply the casing material to the forming collar with the overlapping axially extending edges of the casing material being held under the horn. In particular embodiments, the apparatus may also include a spray assembly mounted to the roll support assembly. The spray assembly may include a plurality of spaced apart spray nozzles disposed upstream of the bar and configured to spray liquid onto the casing material as the casing material enters the forming collar. In particular embodiments, the casing horn is configured to pivot from side-to-side and/or laterally outward while held in a substantially horizontal or level configuration with the casing horn flow channel and pivot head flow passage in fluid communication.

Other embodiments are directed to derucker assemblies that cooperate with a netting chute to automatically draw netting to a downstream location on the netting chute. The assemblies include a horizontal slide assembly in communication with the pair of netting grippers. The horizontal slide assembly comprising a slide support and a horizontal slide actuation cylinder for automatically reciprocating the netting grippers forward and rearward in a derucker stroke cycle. In operation, the derucker grippers travel in a downstream direction guided by the horizontal slide support while drawing netting in the downstream direction.

In some embodiments, the horizontal slide assembly can include first and second gripper actuation cylinders, a respective one attached to a respective one of the grippers. The grippers can be pivotably attached to a horizontal support bar that is attached to the horizontal slide support. The gripper actuation cylinders can be configured to controllably pivot the grippers toward and away from opposing sides of the netting chute substantially in concert.

Still other embodiments are directed to computer program products. Some embodiments are directed to computer program products for operating a derucking device that cooperates with a supply of elastic netting material. The computer program product includes a computer readable storage medium having computer readable program code embodied in the medium. The computer-readable program code includes computer readable program code configured to direct the movement of a derucker assembly to cause the derucker to automatically reciprocally move between downstream and upstream locations to carry out a derucker stroke cycle.

In some embodiments, the computer program products include computer readable program code configured with two selective operational modes for a pair of gripping derucker arms, a braking mode or a derucking cycle mode. In particular embodiments, the program code is configured to control the pressure of a braking and derucker pressure regulator operatively associated with the gripping derucker arms.

Yet other embodiments are directed to systems for producing netting encased products. The systems include: (a) a releaseably mountable laterally pivotable horn that, in operation, is configured to be in fluid communication with a filler pump located upstream thereof, the horn configured and sized to flow semi-solid product therethrough; (b) a supply of edible casing material held in a roll above the horn; (c) a forming collar held over the horn and configured to cooperate with the roll of casing material and the horn to form and guide edible casing material over the circumference of the horn to define a generally tubular axially extending casing with overlapping edge portions; (d) a netting chute sized and configured to laterally pivot in concert with the horn and to receive at least a portion of the horn therein so that the downstream end portions of the netting chute and horn terminate at substantially the same axial location, the netting chute being radially spaced apart from the horn to define a generally circumferential axially extending gap space through which the generally tubular casing material extends; (e) a sleeve of elastic netting material held on the netting chute; and (f) a derucker assembly having a pair of grippers that are disposed on generally opposing side portions of the netting chute in communication with the netting material and the netting chute. In operation, the derucker assembly automatically reciprocally travels back and forth to pull short lengths of netting material from an upstream portion to a downstream end portion of the netting chute.

Still other embodiments are directed to edible casing assemblies adapted to be mounted to a structure holding a horn in fluid communication with a pump/filler. The assemblies include: (a) a frame configured to mount to the structure proximate an upstream portion of a product horn configured to pump semi-solid product therethrough; (b) a roller attached to the frame extending laterally across and above the horn, the roller configured to releasably hold a consumable supply of edible roll stock; (c) a casing forming collar mounted to the frame and extending about an exterior portion of the horn, wherein, the collar is configured to form the roll stock into a generally tubular shape with a lap seam disposed on an underside thereof; and (d) a plurality of spaced apart netting chute attachment members attached to a downstream portion of the frame, the netting chute attachment members configured to releasably hold the netting chute so that, in position, the netting chute extends in a downstream direction therefrom and receives at least a portion of the horn therein with the horn and netting chute being substantially concentrically aligned.

In some embodiments, the frame can be configured to attach to a pivotable horn such that the frame with the roller, the collar and, when attached, the netting chute, pivot laterally. In some embodiments, the plurality of attachment members may include cone projection members configured and sized to extend through apertures on the netting chute and the assemblies may include a horizontal slide assembly.

Other embodiments are directed to spray assemblies configured to releasably mount to a packaging apparatus with a product horn. The spray assembly includes a plurality of spaced apart spray nozzles configured to spray liquid in a downstream direction onto a casing material as the casing material enters a forming collar.

In some embodiments, the spray nozzles are held on a curvilinear bar that is releasably detachable from a sheet roll assembly support disposed above the horn and the bar may have a width that is at least about as great as the width of the horn and hold the nozzles in spaced apart adjustable locations with adjustable spray angles with at least some of the nozzles residing at different horizontal and/or vertical heights than the others.

Still other embodiments are directed to insulated product horns configured to pump a desired product therethrough for packaging. The horn includes a plurality of substantially concentric spaced apart walls.

In some particular embodiments, the plurality of walls can be two axially extending walls that merge into opposing sealed portions that define a circumferentially extending sealed air chamber therebetween (i.e., a double walled horn). In some other embodiments, the insulated gap can comprise other insulating materials such as foam, plastic beads, elastomeric materials or other suitable insulating materials including fluids and/or gases.

It is noted that embodiments described with respect to a particular type of implementation can be implemented in other ways, such as for example, where embodiments are described as methods those features can be implemented as computer program products and/or hardware or software devices. These and other objects and/or aspects of the present invention are explained in detail in the specification set forth below.

BRIEF DESCRIPTION OF THE DRAWINGS

FIG. 1A is a front view of an exemplary apparatus according to embodiments of the present invention.

FIG. 7 is a side perspective view of a portion of an exemplary device according to embodiments of the present invention.

FIG. 8 is a side perspective view of a portion of the apparatus shown in FIG. 1A, looking upstream from a position proximate the netting chute according to embodiments of the present invention.

FIG. 9 is a side perspective view of a portion of the apparatus shown in FIG. 7, looking downstream from a position proximate the ingress portion of the horn.

FIG. 11 is a side perspective view of an apparatus similar to the device shown in FIG. 1A, illustrating that certain components may be configured to laterally pivot for loading and/or service according to embodiments of the present invention.

FIG. 12 is a top view of a horn assembly illustrating an exemplary laterally pivoted load configuration according to embodiments of the present invention.

FIG. 13 is a side perspective view (looking upstream) of an exemplary apparatus illustrating the netting horn and product horn being concurrently pivoted outward for access and illustrating a quantity of product captured in the casing and surrounded by netting according to embodiments of the present invention.

FIG. 27A is a front view of the apparatus shown in FIG. 1A with a different horn configuration releasably mounted thereto according to embodiments of the present invention.

FIG. 27B is a front view of the apparatus shown in FIGS. 1A and 27A with yet another horn configuration releasably mounted thereto according to embodiments of the present invention.

DETAILED DESCRIPTION OF EMBODIMENTS OF THE INVENTION

Figure 1B:
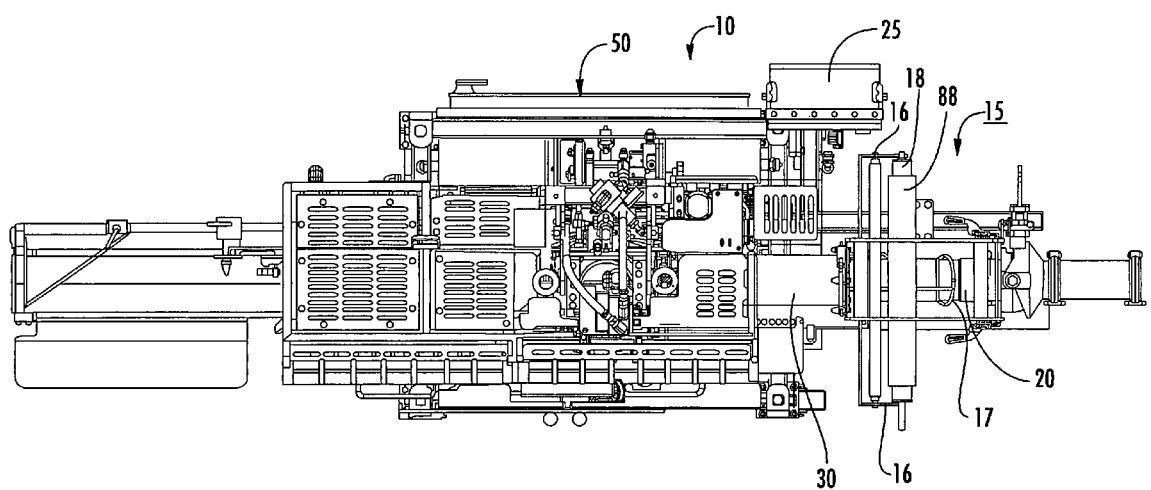
FIG. 1B is a top view of the apparatus shown in FIG. 1A.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements throughout. In the figures, certain layers, components or features may be exaggerated for clarity, and broken lines illustrate optional features or operations unless specified otherwise. In addition, the sequence of operations (or steps) is not limited to the order presented in the claims or figures unless specifically indicated otherwise. Where used, the terms "attached", "connected", "contacting", "coupling" and the like, can mean either directly or indirectly, unless stated otherwise. The term "concurrently" means that the operations are carried out substantially simultaneously.

In the description of the present invention that follows, certain terms are employed to refer to the positional relationship of certain structures relative to other structures. As used herein, the terms "front," "forward" and derivatives thereof refer to the general or primary direction that the filler or product travels in a production line to form an encased product; this term is intended to be synonymous with the term "downstream," which is often used in manufacturing or material flow environments to indicate that certain material traveling or being acted upon is farther along in that process than other material. Conversely, the terms "rearward," "upstream" and derivatives thereof refer to the directions opposite, respectively, the forward and downstream directions.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein.

The term "frame" means a generally skeletal structure used to support one or more assemblies, modules and/or components. The term "modular" means that a subassembly is designed with standardized dimensions, mounting features and/or configurations for interchangeable use with other equipment. In certain embodiments, the apparatus can employ a releasably attachable casing module that is configured to have the same centerline as a horn and may be selectively mounted on a "heat-seal" or other type of pumpable product/casing supply apparatus. The term "automated" means that the apparatus is configured to carry out most actions via automated control (i.e., pumping, encasing, voiding, clipping) without requiring ongoing manual assistance.

The casing can be any suitable casing (edible or inedible, natural or synthetic) such as, but not limited to, collagen, cellulose, plastic, elastomeric and/or polymeric casing. However, embodiments of the present invention may be particularly suited for use with edible and/or process-dissolvable, -resorbable and/or -absorbable casing materials. In some embodiments, the apparatus or methods can employ edible roll stock comprising a collagen film or a dissolvable protein sheet (which is typically less flexible and more paper-like than the collagen film). The process-dissolvable protein may be configured to be absorbed and/or dissolved during cooking.

When using rolls of protein sheet, it may be desirable to apply moisture during the forming of the flat roll of casing material into a generally tubular casing material. However, when forming using collagen film, moisture during the forming process is typically undesirable, albeit it is used after the casing is shaped to help moisture-seal the casing together about the product. In some embodiments, the film and protein sheet can be about 0.002 inches thick. The protein sheet and/or film may be configured to dissolve during processing.

The netting and casing enclosed product can be generally bulbous food product, typically a meat product. The present invention is particularly suitable for producing products that may also employ closure clips to seal products held in the netting and casing. The product may be a linked chain of elongated extruded product held in a casing or a plurality of discrete products that can be formed into generally bulbous elongate shapes. Exemplary products include, but are not limited to, netted smoked and/or cooked ham, netted poultry, netted roasts, netted salami, netted sausages, netted cheese and the like.

Other embodiments of the present invention may be directed to seal other types of food (such as cheese) or other product in casing materials (which are also typically held in netting). Examples of other products include powders such as granular materials including grain, sugar, sand and the like or other flowable materials including wet pet food (similar to that held conventionally in cans) or other powder, granular, semi-solid and/or gelatinous materials. The product may be a packaged for any suitable industry including food, aquaculture, agriculture, environment, chemical, explosives, or other applications.

Figure 1C:
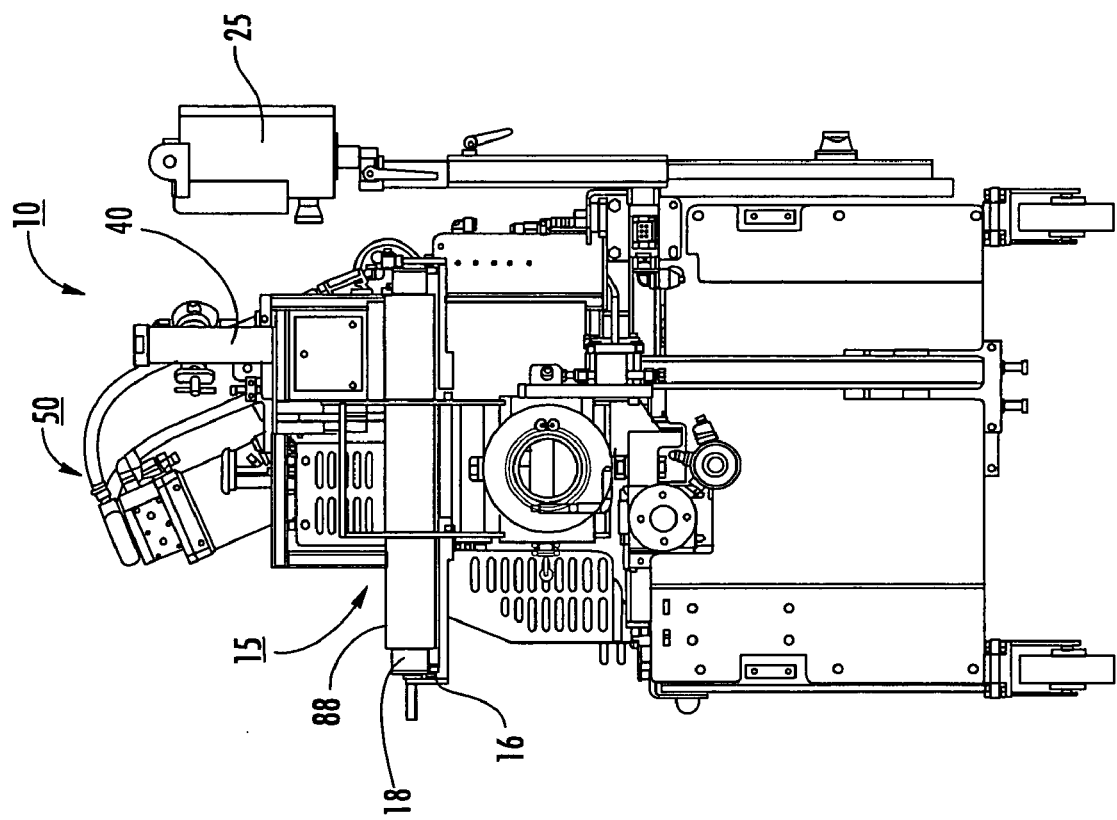
FIG. 1C is a right-hand side view of the device shown in FIGS. 1A and 1B.
Figure 2:
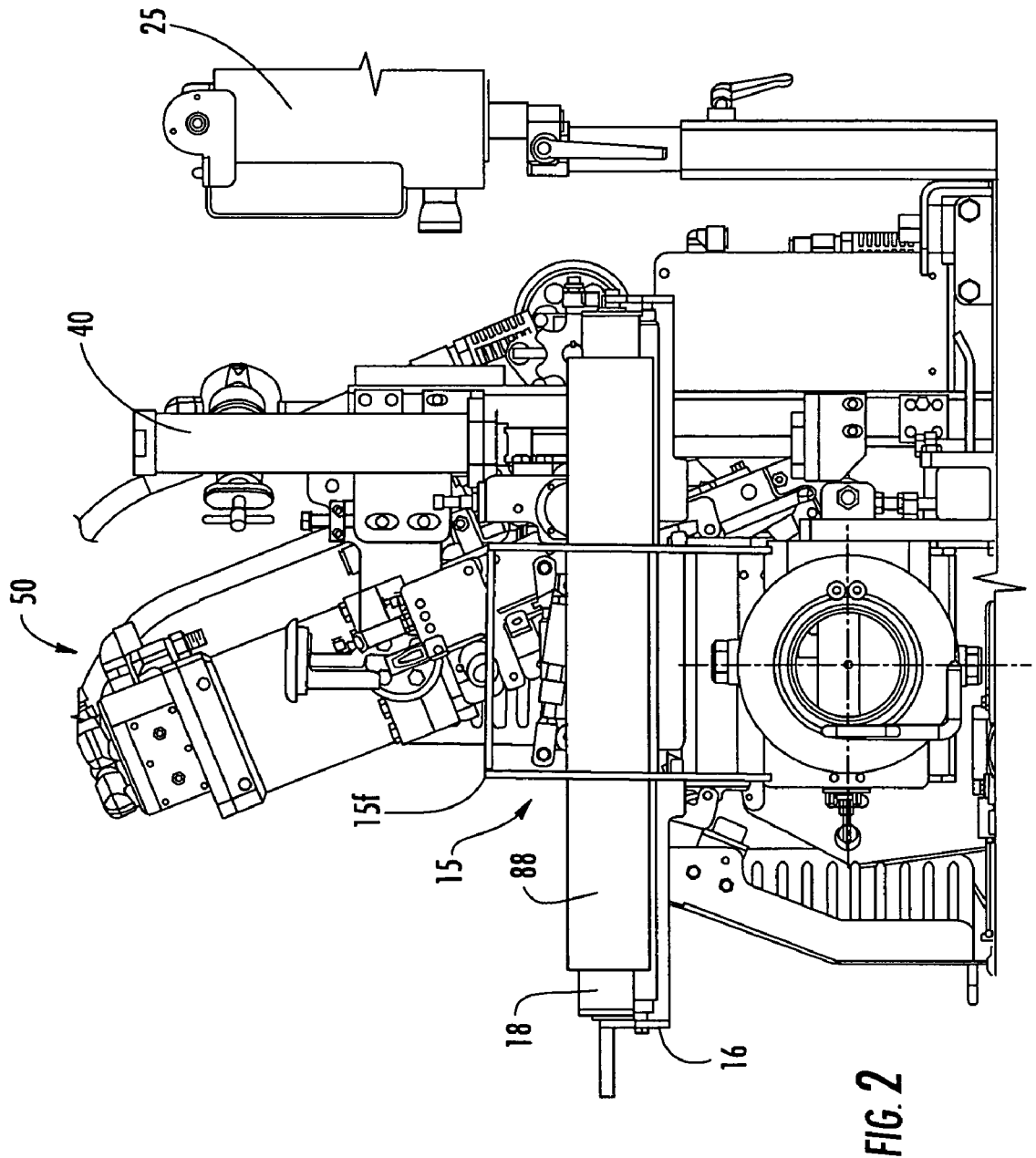
FIG. 2 is an enlarged right hand view of the apparatus shown in FIG. 1A.
Figure 3:
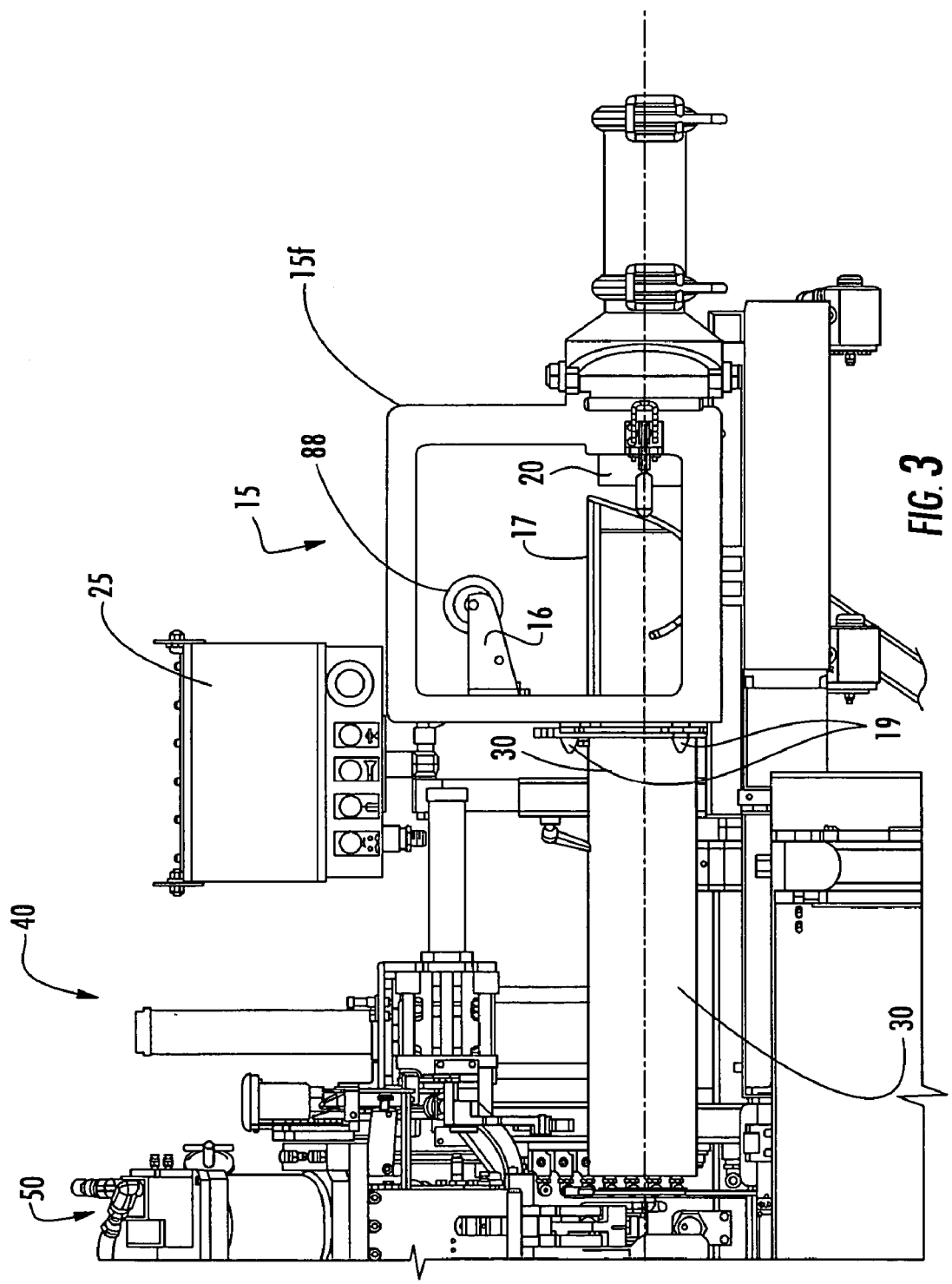
FIG. 3 is a partial front view of the apparatus shown in FIG. 1A with certain housing guards omitted, according to embodiments of the present invention.
Figure 4:
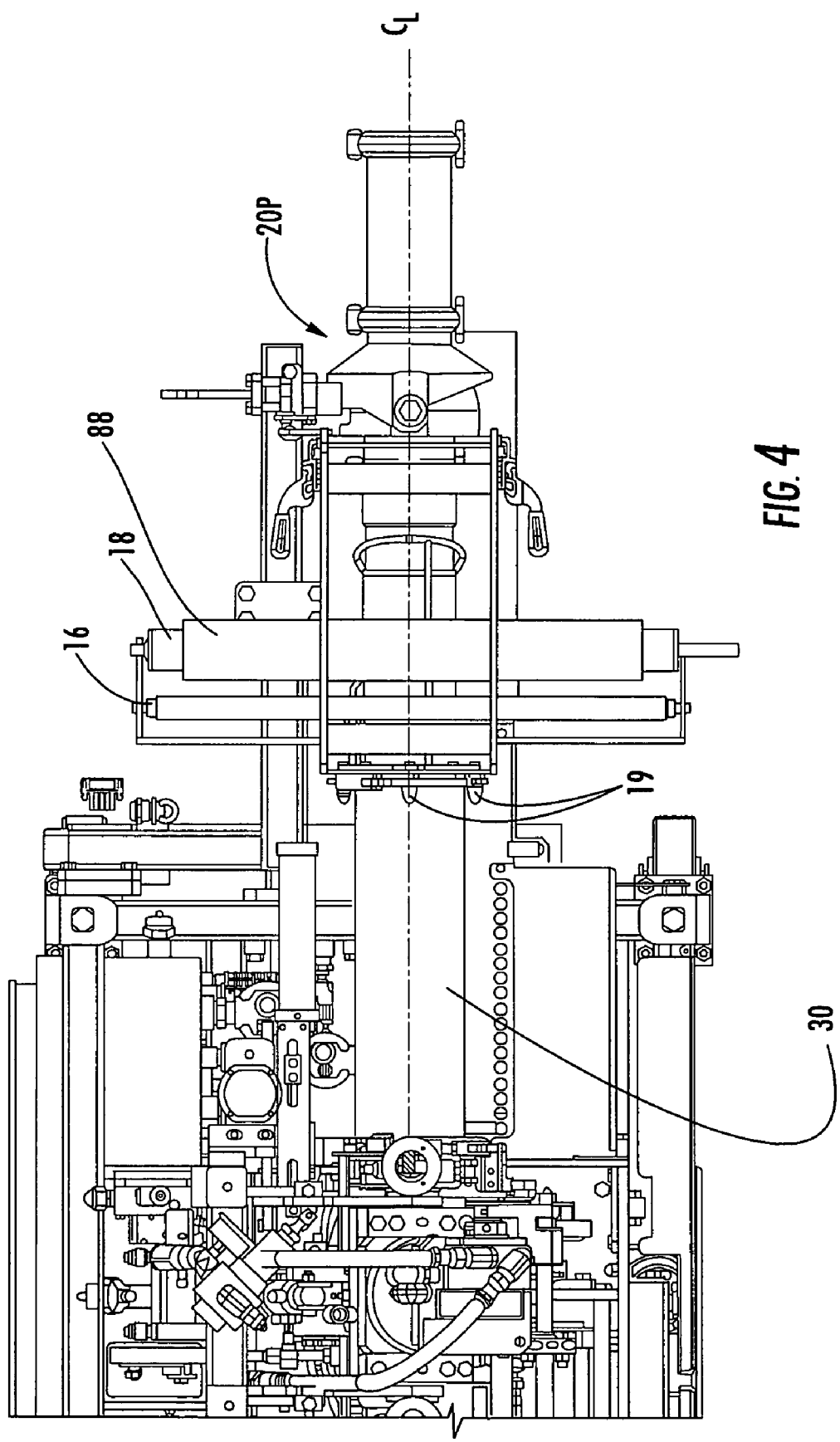
FIG. 4 is a top view of the portion of the apparatus shown in FIG. 3.
Figure 5:
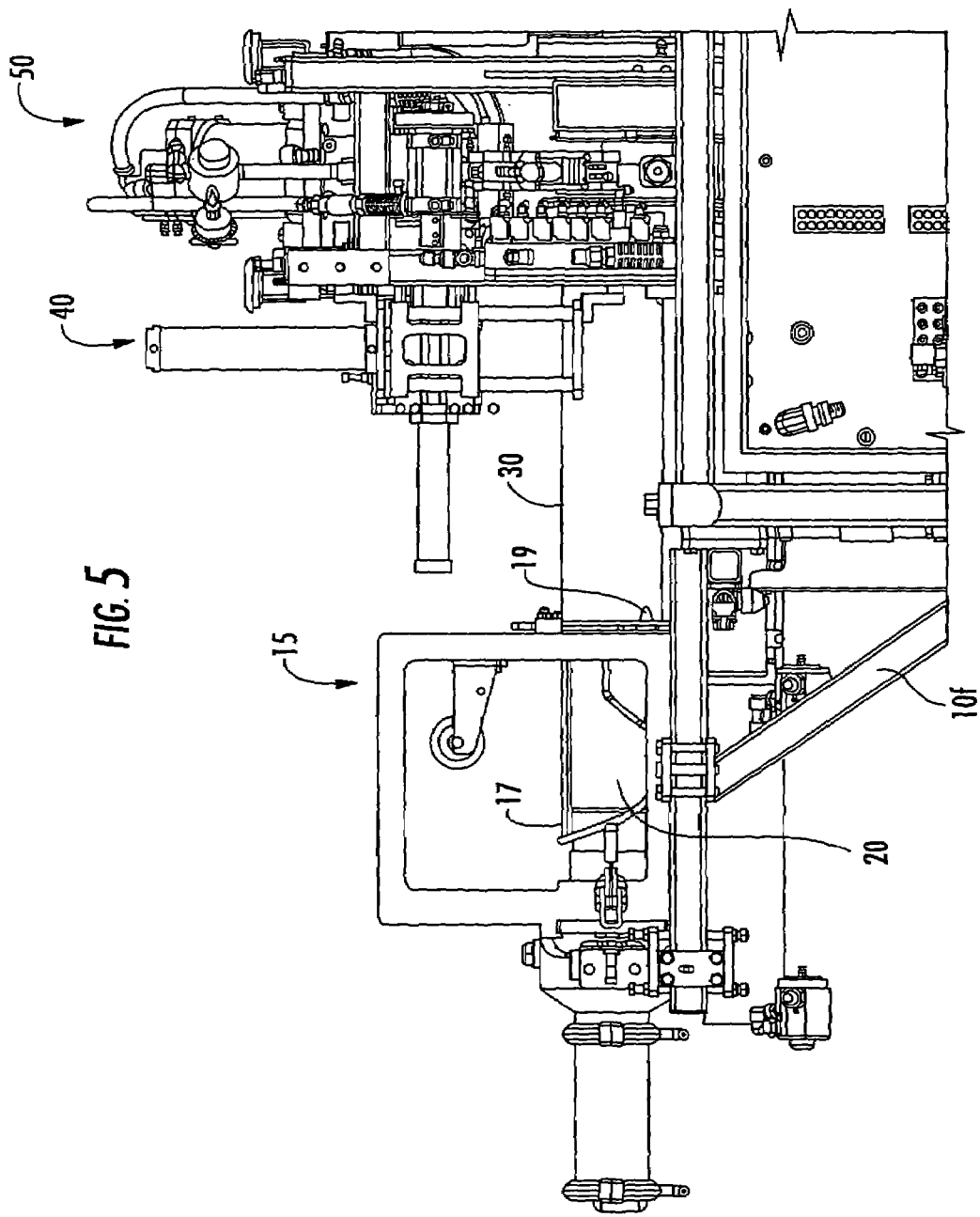
FIG. 5 is a rear view of the portion of the apparatus shown in FIG. 3.

Turning now to FIGS. 1A-1C, an exemplary packaging apparatus or system 10 is shown. As shown, the apparatus 10 includes a casing forming assembly 15, a product horn 20, a controller 25 with a user input (which can be configured as a Human Machine Interface ("HMI")), a netting chute 30 (see also FIG. 8 illustrating a sleeve of netting 30s thereon), a derucker 40 and a clipper assembly 50 that can include a voider 53 (FIG. 14). The apparatus 10 may also include a conveyor 60 disposed downstream of the netting chute 30. The apparatus 10 is configured to engage a pump and filling source (not shown) disposed upstream of the horn 20. The pump can be in communication with a portioner as is known to those of skill in the art.

As shown in FIG. 8, the netting 30s can be elastic and configured to stretch more in the radial direction than in the axial direction. As shown, the netting can be tightly held on the netting chute with the sleeve 30s configured to hold bunched, compressed or more gathered portions of the netting upstream of the egress portion of the chute 30.

In operation, during the pumping process, the casing is drawn off the product horn, stuffed with product, and concurrently encased in (elastic) netting. The moisture and/or exudates(s) in the product can cause the casing to cling to the product and seal the overlapping layers of the casing together along a lower lap seal. Typically the downstream end portion of the netting and casing is clipped or closed to capture the discharged product therein. As the product is discharged from the horn 20 it expands the casing and netting to create a package shape. The netting is stretched tightly over the product with the casing therebetween. The netting can hold the package together during the cooking or other subsequent process and can provide a uniform, aesthetically appealing crosshatch pattern on the finished product. The size of the package formed can vary depending on the casing size, the length of time the filler is activated to discharge product, the tension of the netting, and/or the conveyor speed of the conveyor receiving and holding the encased product. Once the package is filled, the apparatus 10 can void a target portion of the package and apply one or more clips to the voided region of the package. Typically two clips are applied and the package is severed between the clips using an automated knife, as is well known to those of skill in the art. However, a series of linked products can be formed (such as a product known as "beer balls") where a single clip is placed between the linked products and two clips can be applied to stop the linked package and start another series.

In some embodiments, the casing forming assembly 15 is configured as a modular assembly (see FIGS. 15 and 16) that can releasably mount to the frame 10f or structure of a conventional apparatus that runs a different type of food product and/or a different type of casing. For example, the modular assembly 15 can mount to and operate with certain components of a conventional RS4203 packaging apparatus available from Tipper Tie, Inc. located in Apex, N.C.

Figure 20:
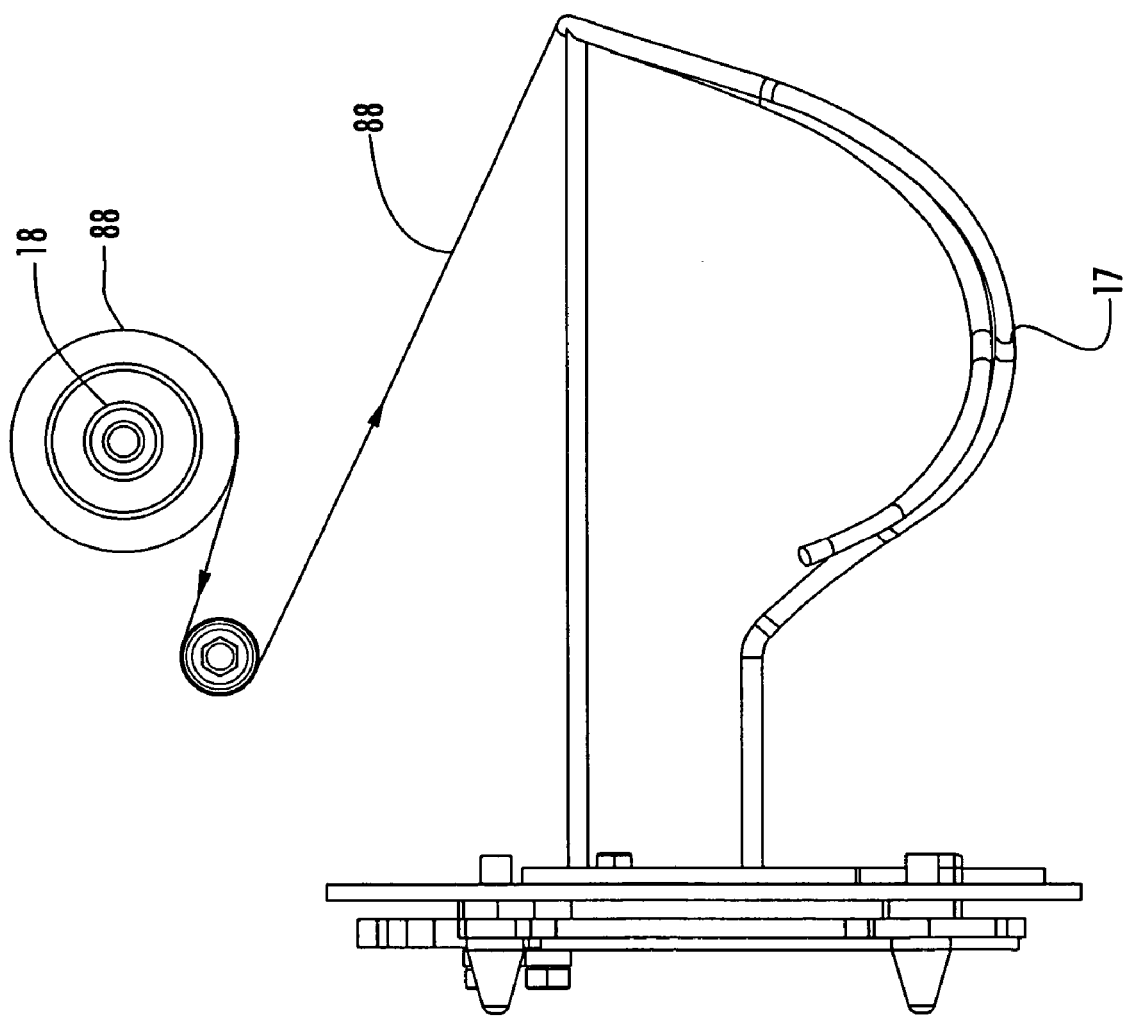
FIG. 20 is a schematic illustration of a casing travel path as it is formed from roll stock into a generally tubular casing shape according to embodiments of the present invention.

Turning again to FIGS. 1A-1C, the forming assembly 15 includes an upwardly extending frame 15f that can releasably mount to the frame 10f of the apparatus 10. The forming assembly 15 is configured to releasably hold a roller 18 that holds a supply of consumable roll stock 88 (FIGS. 1B, 7 and 20) so that the roller 18 and roll stock 88 extend generally laterally across the top of the horn 20. The forming assembly 15 can include a horizontally extending bracket 16 that holds the roller 18 above and proximate an intermediate to upstream portion of the underlying horn 20.

The forming assembly 15 also includes a forming collar 17 (also known as a forming shoulder) that extends about a portion of the horn 20 and cooperates with the roll stock 88 to convert the generally flat roll stock material into a generally tubular casing as the material 88 travels downstream over the horn 20 guided by the forming collar 17. The collar 17 can be mounted substantially concentrically with respect to the horn 20 and is disposed upstream of the netting chute 30. The collar 17 and sheet stock 88 can be configured to direct opposing long edge portions of the roll stock 88 to travel together to overlap on a lower surface of the casing, typically at an underside portion of the casing as the casing material is drawn downstream. The seam overlap may remain unsealed or may seal to define a moisture-sealed lap joint upon contact with moisture and/or exudates from the product in the horn 20 as the product exits the horn 20 (and netting chute 30). For most edible casings, no active heat sealing will be required or used.

The horn 20 can include at least a forward or downstream portion that is configured as a double-walled horn (or even greater number of walls) with a sealed air and/or insulated gap space between the inner wall and the outer wall thereof to inhibit moisture forming on the outer wall (from the product in the horn). The double walled horn 20 may be particularly useful where collagen film casing is employed. In some embodiments, the insulated gap can comprise other insulating materials such as foam, plastic beads, elastomeric materials or other suitable insulating materials including fluids and/or gases. The insulating material can be formed on the inner primary surface of the outer wall or the outer primary surface of the inner wall before the walls are joined. In other embodiments, the insulating material can be flowed into the chamber after the tubes are joined.

Figure 17:
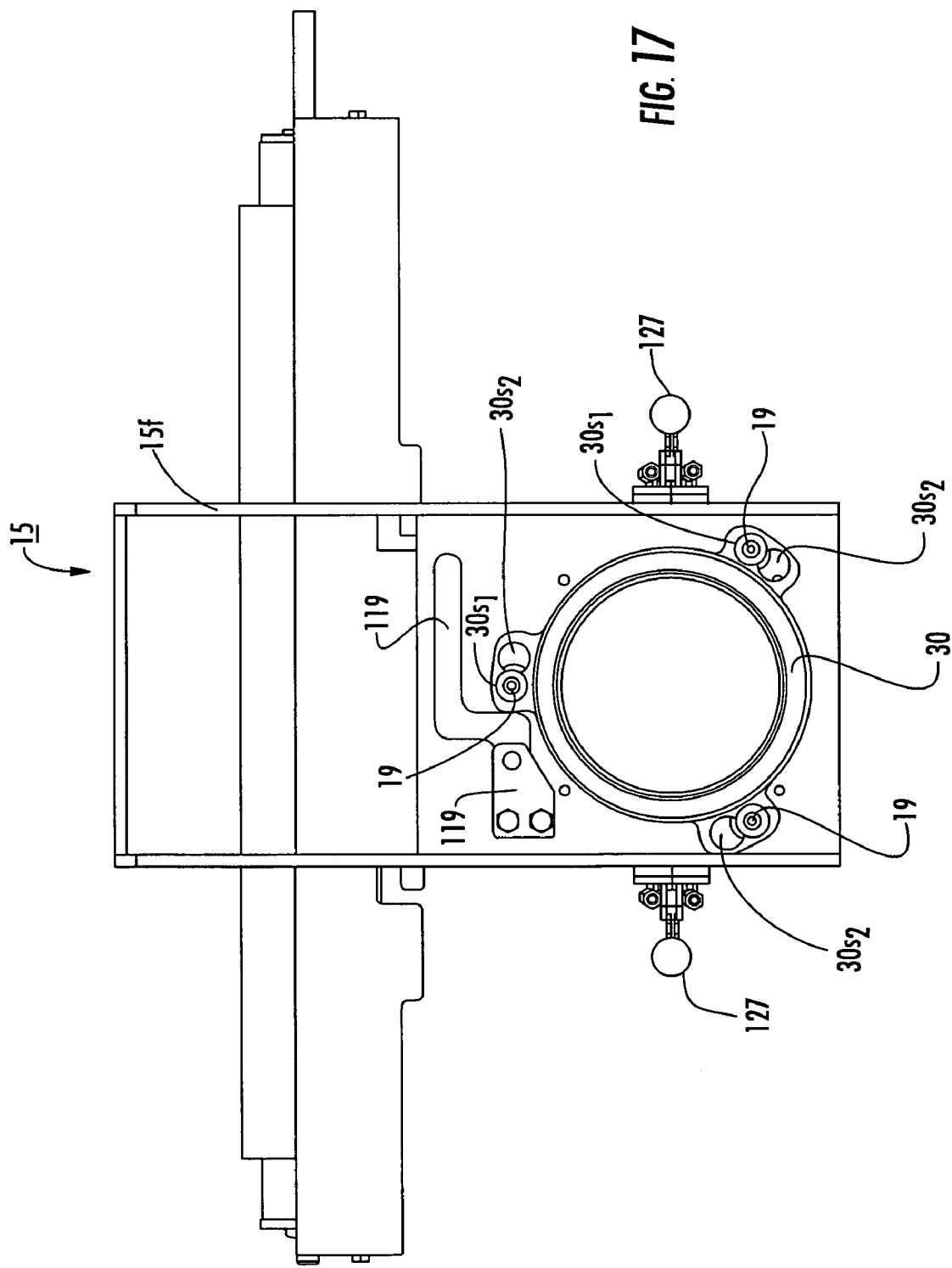
FIG. 17 is a left hand side view (looking upstream) of the assembly shown in FIG. 15.

As shown in FIGS. 3-5, 15 and 17, in some embodiments, the frame 15f can also be configured to releasably mount the netting chute 30 thereto. For example, the frame 15f can employ bayonet style mounting configurations, which allow positive positioning and provide for a relatively quick mount and release system. Referring to FIG. 11, the netting chute 30 is shown as it approaches the horn 20 to receive the horn 20 therein. The netting chute 30 can include mounting apertures 30a that engage the frame 15f for mounting thereto. The frame 15h can include forwardly oriented projections 19 which are configured to enter the apertures 30a and provide a quick mount (and quick release) configuration. Referring to FIG. 17, the apertures 30a can be configured with a smaller segment $30s_1$, that merges into a larger receiving segment $30s_2$. To load the netting chute 30, the larger segments $30s_2$ are aligned with corresponding projections 19 and the apertures $30s_2$ slid thereon. Once the projections 19 extend through the aperture 30a, i.e., typically through a respective larger segment $30s_2$, the horn 30 can be rotated to place the projections in the smaller segments $30s_2$ and a locking member 119 can apply force to hold the chute 30 in the operative position. The locking member 119 can have a pivot 119p that allows it to rotate in and out of operative position. The mounting configuration is configured to provide ease of insertion and tighter engagement of the netting chute 30 for a more precise centerline alignment with the product horn 20 during operation.

Figure 15:
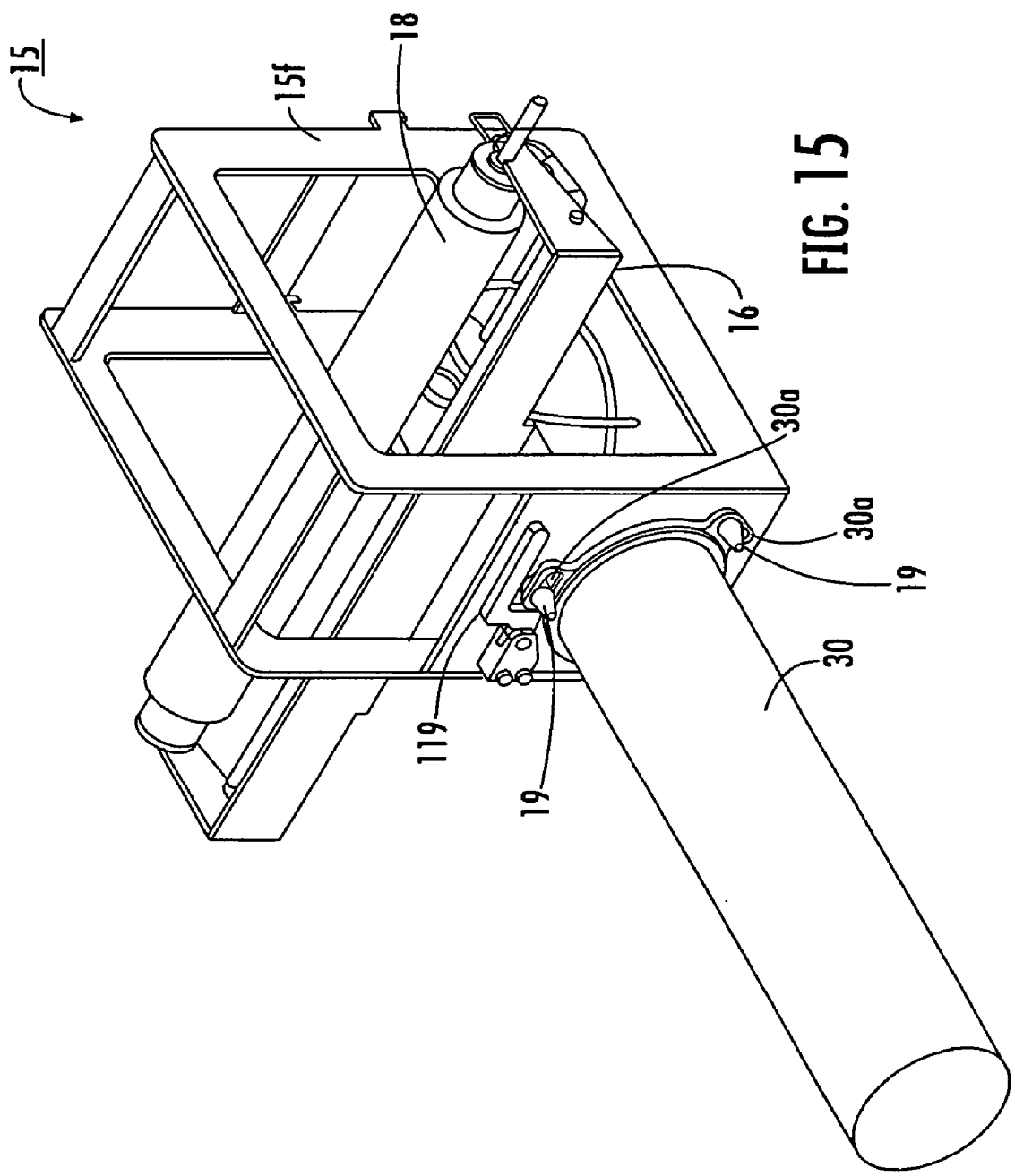
FIG. 15 is a perspective view of a roll support frame assembly according to embodiments of the present invention.
Figure 16:
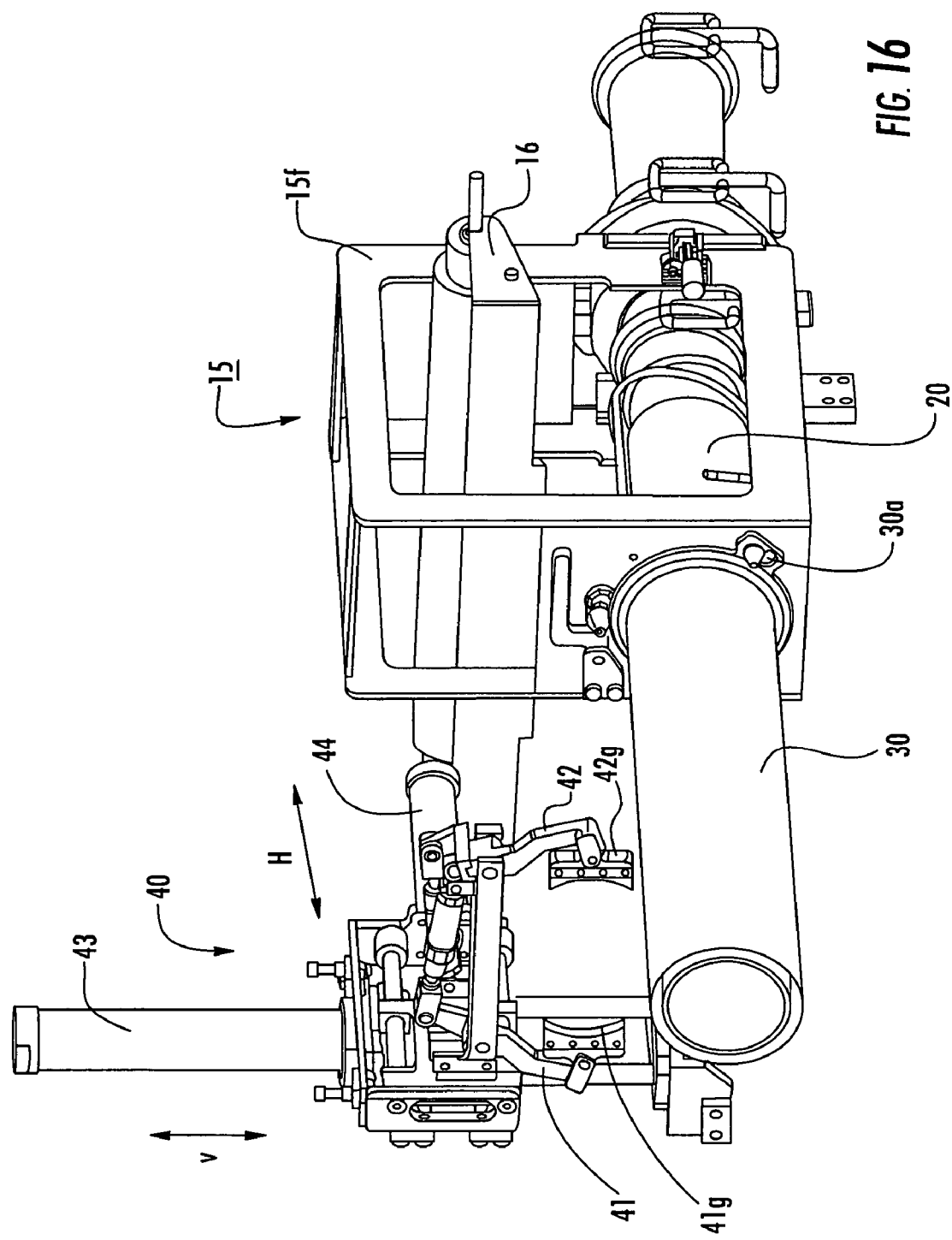
FIG. 16 is a perspective view of an edible casing assembly which may be modularized according to embodiments of the present invention.
Figure 18:
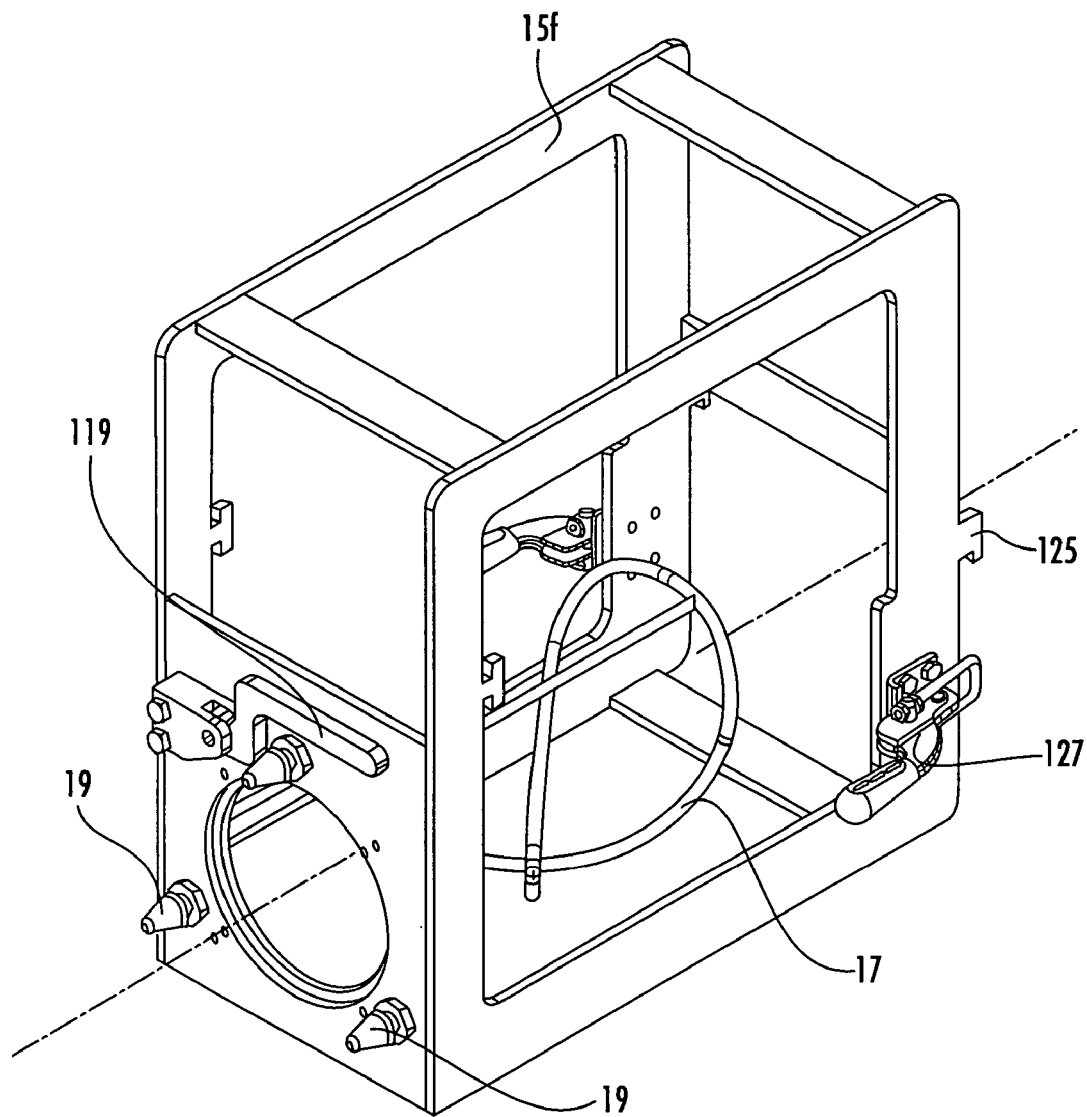
FIG. 18 is a side perspective view of a collar and netting chute frame assembly according to embodiments of the present invention.
Figure 19:
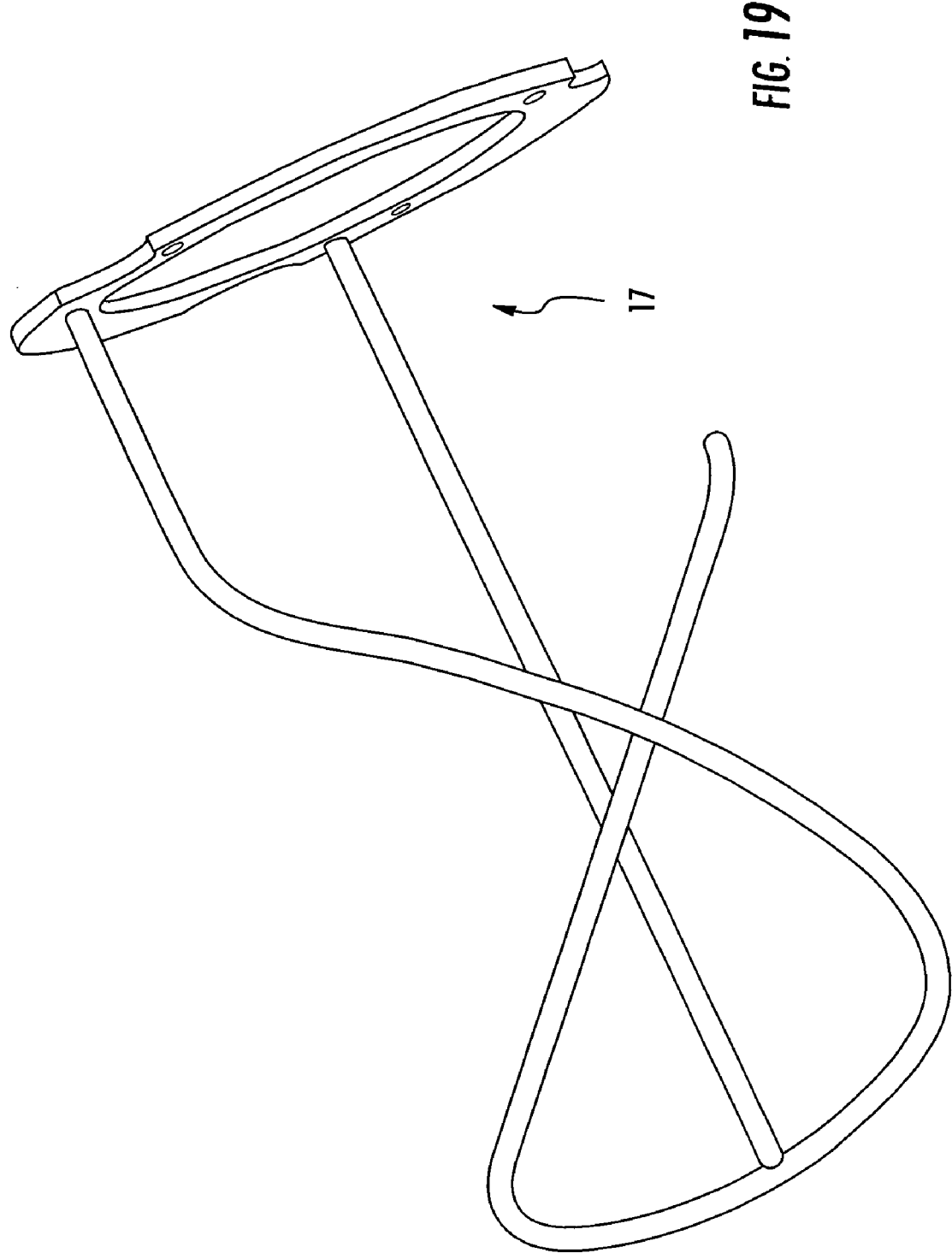
FIG. 19 is a perspective view of a forming collar according to embodiments of the present invention.

In some embodiments, as shown for example in FIGS. 15, 16 and 18, the projections 19 may have a generally conical shape (i.e., cone-like or tapered projections such as generally frustoconical shapes) that are sized and configured to enter the netting chute apertures 30a.

In position, the netting chute 30 is configured to receive at least a portion of the horn 20 therein; typically the netting chute 30 is configured to receive at least a major portion of the horn 20 therein. The horn 20 and netting chute 30 typically terminate at the same axial downstream location. In some embodiments, the downstream portion of the horn 20 may extend out of the netting chute 30 or the netting chute 30 may extend a further downstream axial distance than the horn 20.

Figure 6:
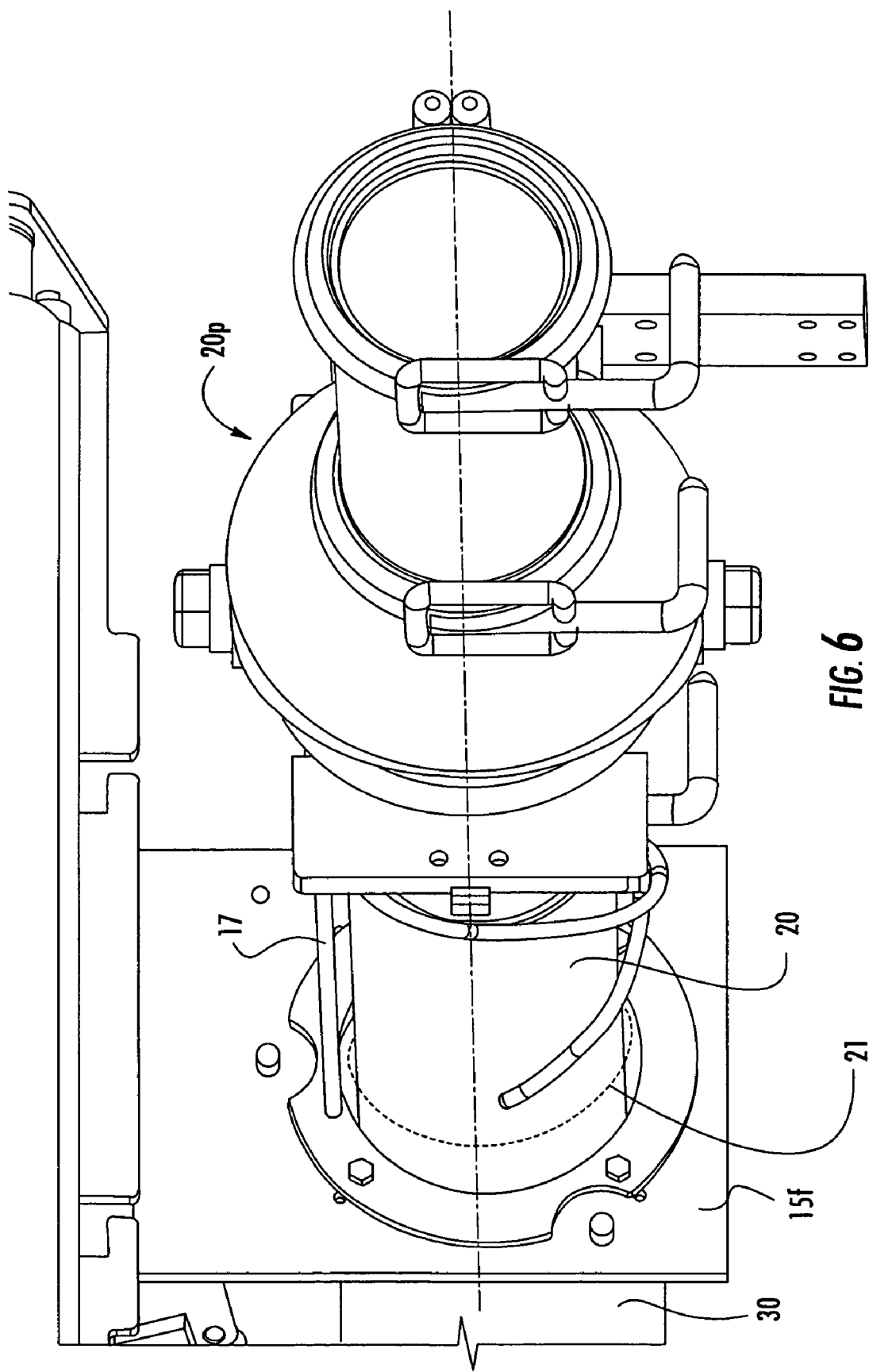
FIG. 6 is a side perspective view of a portion of the apparatus shown in FIG. 3.

The frame 15f can be configured to hold the netting chute 30 so that it is substantially concentrically aligned with the horn 20. As shown in FIGS. 6 and 13, the netting chute 30 and horn 20 can define an axially extending circumferential gap space 21 through which the generally tubular casing travels (in tubular form) during operation as the casing is drawn downstream under the collar 17 and over the horn 20. The gap space 21 may span a width of between about 0.25-0.4 inches and the casing material can be timed to be drawn generally concurrently with/during a pumping operation. Generally stated, the apparatus 10 can be configured to form a length of generally tubular casing in situ, pump product into the casing and enclose the casing in netting. The casing is threaded about the horn 20 and forming collar 17. The upstream (single-wall) portion of the horn 20 can act as a relief zone for the material 88 to transition from the flat roll to round form with the lap seal on the bottom portion of the horn 20.

Referring to FIGS. 11-13, the horn 20 can be configured to laterally pivot via a horn rotor assembly or horn pivot assembly 20p. FIG. 12 illustrates that the horn 20 can pivot to a load position that is about 20-30 degrees from the operative in-line position. An example of a horn pivot/rotor assembly 20p is described in U.S. patent application Ser. No. 10/729,282, the contents of which are hereby incorporated by reference as if recited in full herein. Similarly, as shown in FIGS. 11 and 13, the assembly 15 and netting chute 30 can be mounted to the horn 20 so that the assembly 15 and chute 30 also laterally pivot in concert with the horn 20 responsive to movement of the horn 20.

FIG. 12 illustrates that the horn pivot assembly 20p can include a mounting plate 125 that releasably engages the frame 15h. FIGS. 11 and 18 illustrate that the frame 15h can include mounting tabs 126 that are sized and configured to snugly fit over the plate 125. Side locking members 127 (which may comprise cam locks fasteners) can be used to lock the frame 15h to the horn pivot bracket 125 and allow the frame 15h to laterally pivot with the horn 20 to allow an operator to have easier access to the horn 20 and/or 30.

Figure 10A:
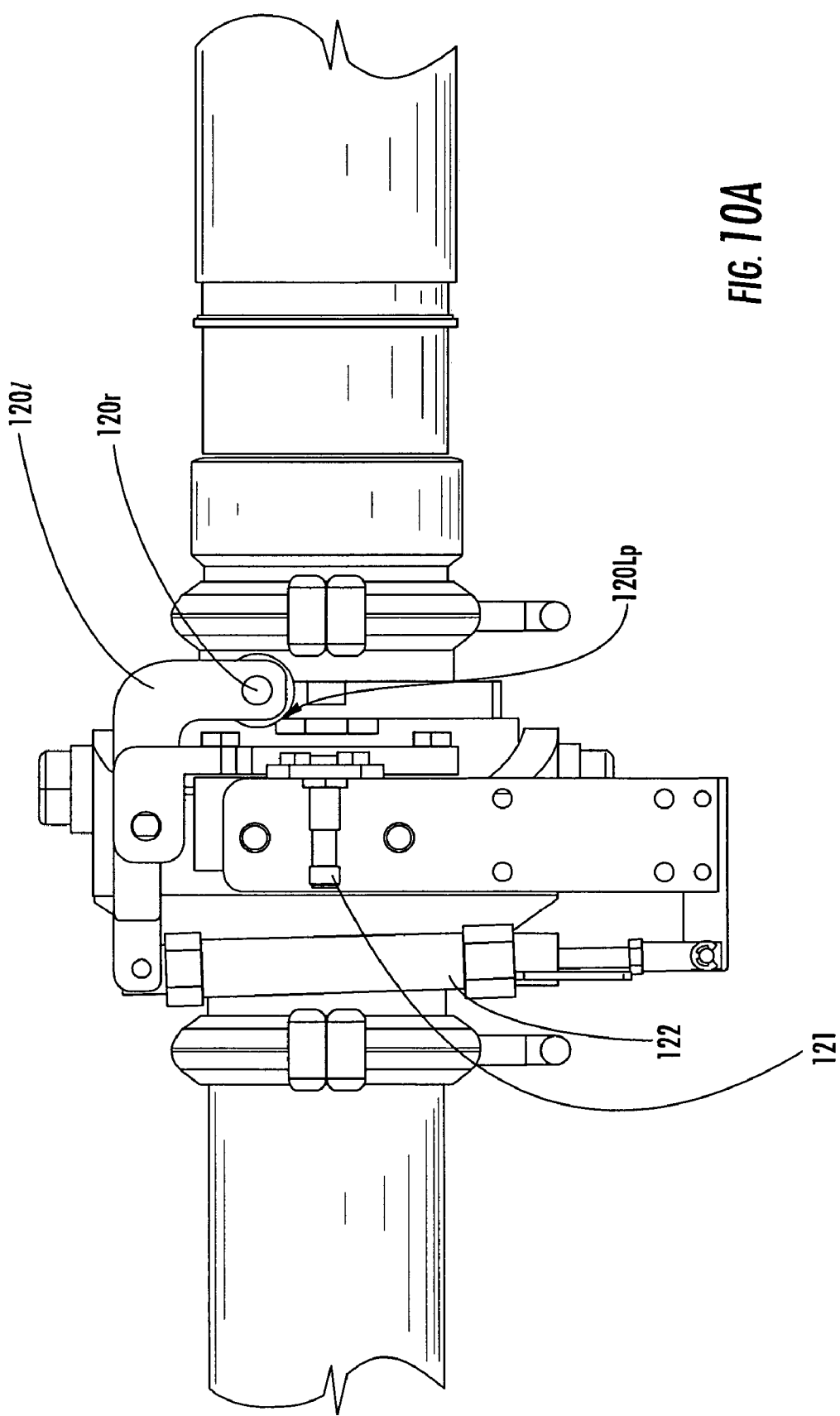
FIG. 10A is a greatly enlarged portion of a horn latch lever assembly according to embodiments of the present invention.
Figure 10B:
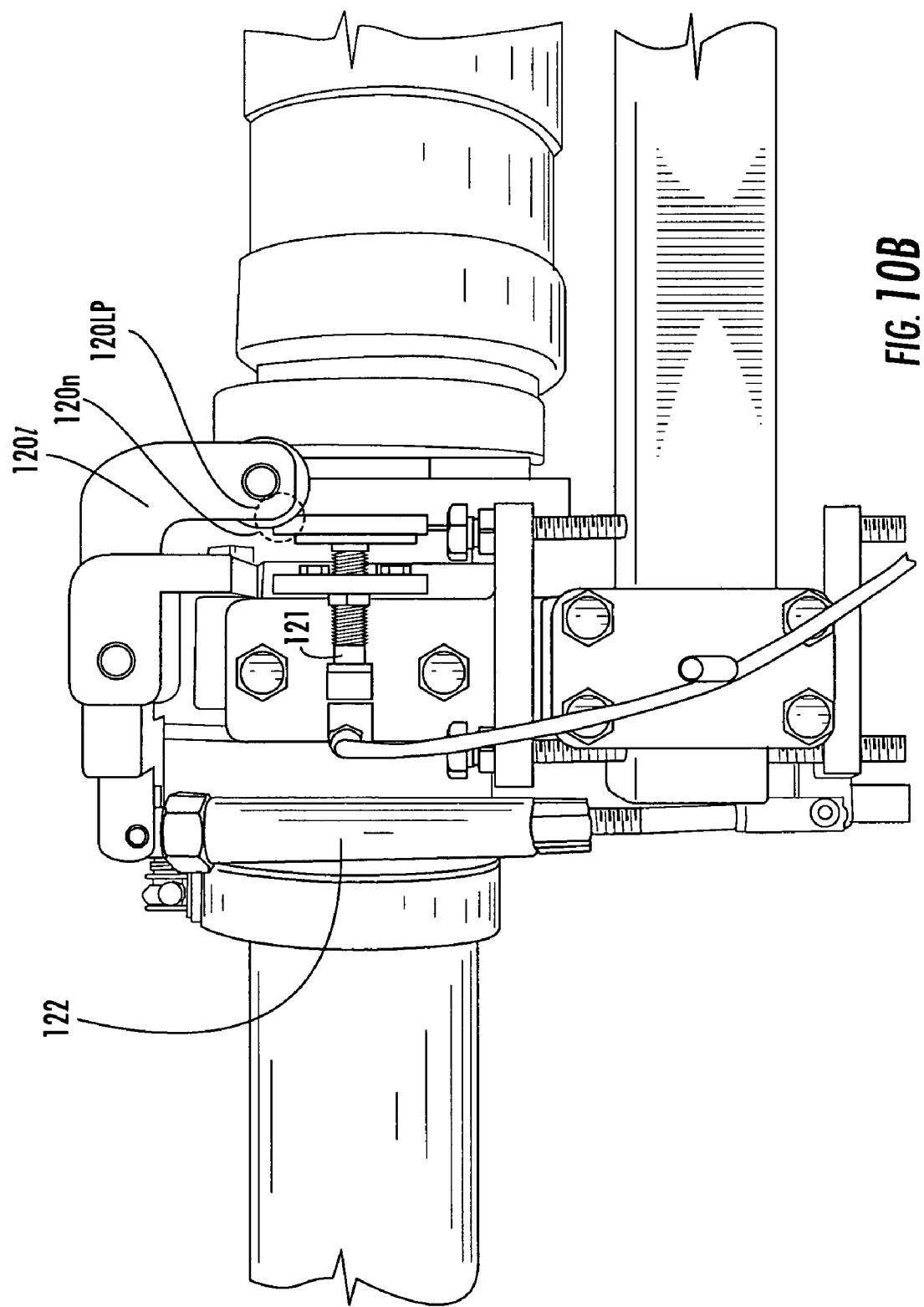
FIG. 10B is an exemplary horn latch assembly shown in FIG. 10A according to embodiments of the present invention.

FIGS. 10A and 10B show that the apparatus 10 can include a horn latch lever assembly 120 that can provide a positive latch for the pivot assembly 20p to inhibit or prevent inadvertent movement of the horn 20. The horn latch lever assembly 120 can comprise an actuation cylinder 122, a rocker arm lever 120l, a detent roller 120r and a latch plate 120lp. The apparatus 10 can also include a proximity sensor 121 that detects when the horn is in operative position to inhibit pumping until the horn 20 is in alignment. Once in alignment, the actuation cylinder 122 can extend, lowering the latch lever arm 120l that positions the detent roller 120r on the latch plate 120, thereby applying a locking pressure at the latch point 120lp. In some embodiments, the actuator 122 can be configured to provide a generally constant bias pressure that can be overcome by intentional movement to the laterally pivoted configuration. In other embodiments, the cylinder 122 can be configured to automatically provide and remove the pressure based on HMI commands and/or proximity sensor data. Combinations of the operational features of the latch may also be used.

FIGS. 7 and 9 illustrate that the frame 15h can also hold a plurality of spaced-apart spray nozzles 95 that are oriented to spray a fluid (typically a liquid such as water) onto the casing material 88 as the material enters the forming collar 17. The spray nozzles 95 can be adjustable in position and/or spray direction. That is, the spray nozzles 95 can be held on a bar so that each can be adjustably rotated and/or moved (up and/or down or laterally across) the bar 95b. As shown, six spray nozzles 95 are spaced to cover substantially the entire width of the roll sheet 88 and so that some reside vertically above the others. Lesser or greater numbers of nozzles 95 can be used. In addition other mounting configurations may also be used. The spray nozzles 95 can be automatically activated to spray concurrently only when the casing is being drawn downstream, i.e., with the pumping and voiding of product through the horn 20 and/or with the forming of the casing material 88 (and to be inactive during non-pumping periods). The spray nozzles 95 may be particularly useful for edible and/or dissolvable rice paper or protein casing sheets and the like, but may be less desirable for collagen film applications.

Figure 14A:
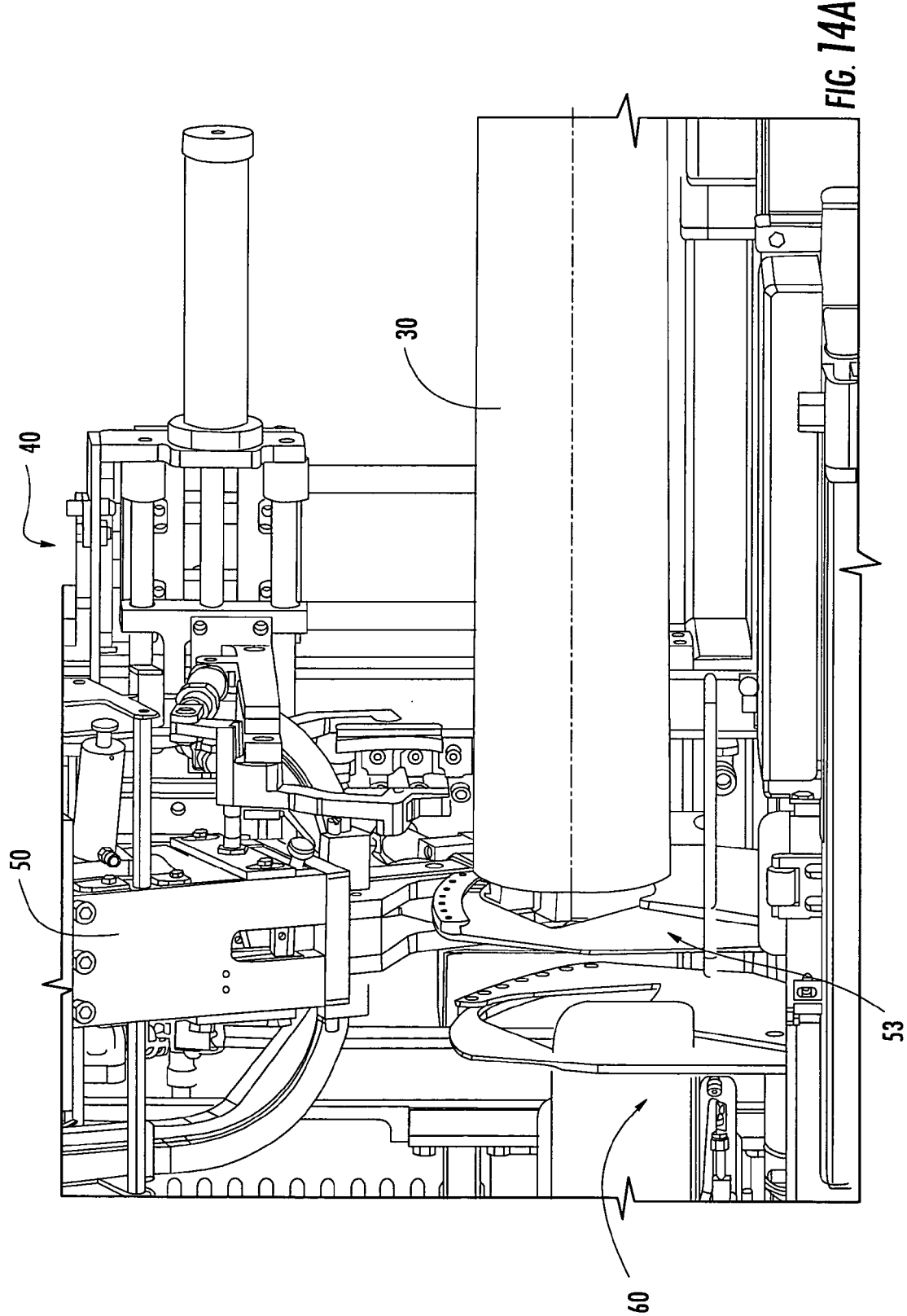
FIG. 14A is a side perspective view of another portion of the apparatus shown in FIG. 1A, with the housing guards omitted according to some embodiments of the present invention.

FIG. 14A illustrates the clipper 50 and derucker 40 proximate a downstream or egress portion of the netting chute 30 (and product horn 20). As is well known to those of skill in the art, the clipper 50 cooperates with a voider 53 comprising voider plates that void the casing prior to applying one or more clips using the clipper 50. In some embodiments, the clipper 50 can include gathering plates that help gather the casing and netting into a rope like segment prior to applying the clip(s). The product can be caught on a conveyor 60 that moves the encased product downstream of the clipper 50. The speed of the conveyor 60, size of the horn 20, pump speed, netting size and elasticity and the like can be adjusted to consistently provide the desired product shape (see, e.g., FIG. 25).

Figure 14B:
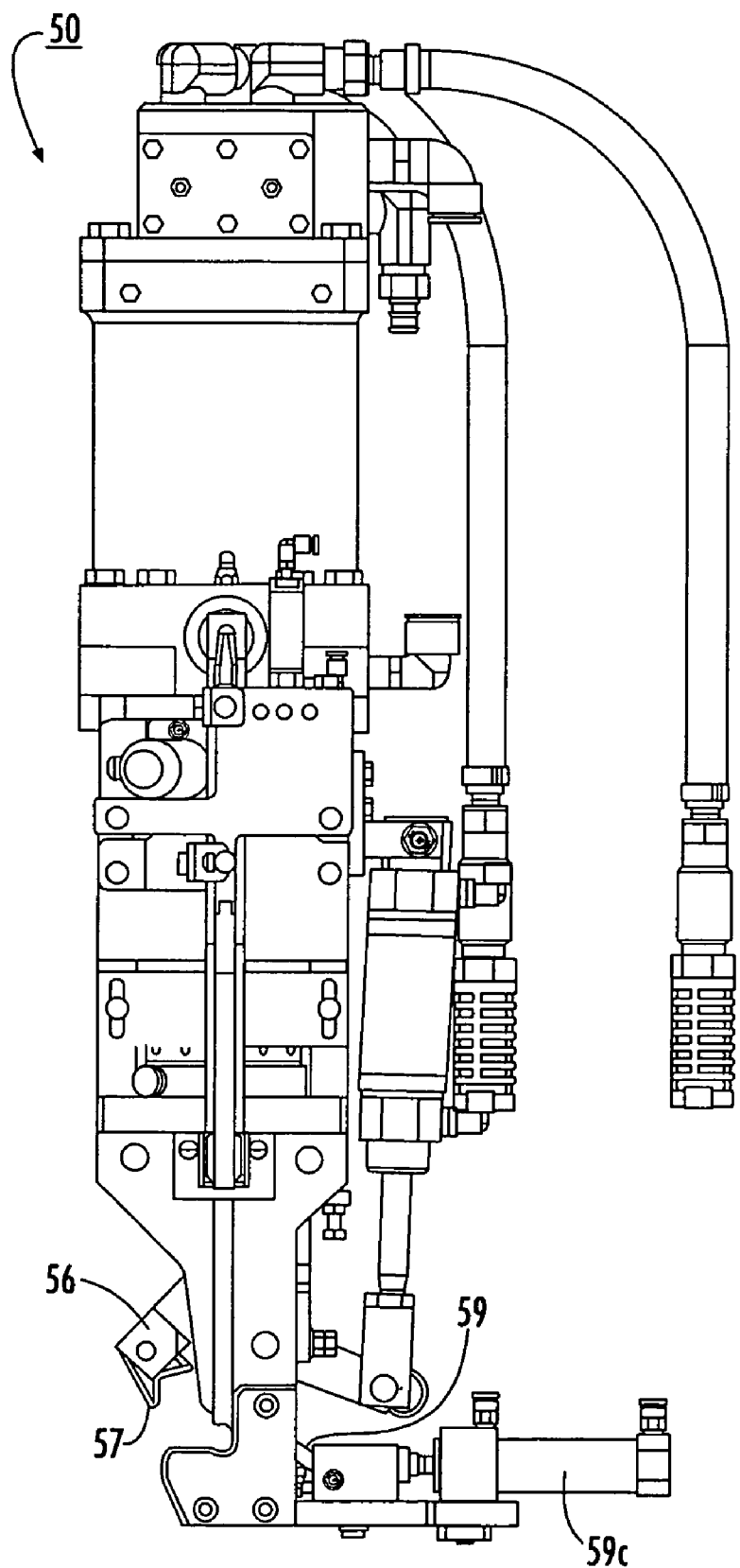
FIG. 14B is a side view of a portion of the clipper shown in FIG. 14A according to embodiments of the present invention.
Figure 14C:
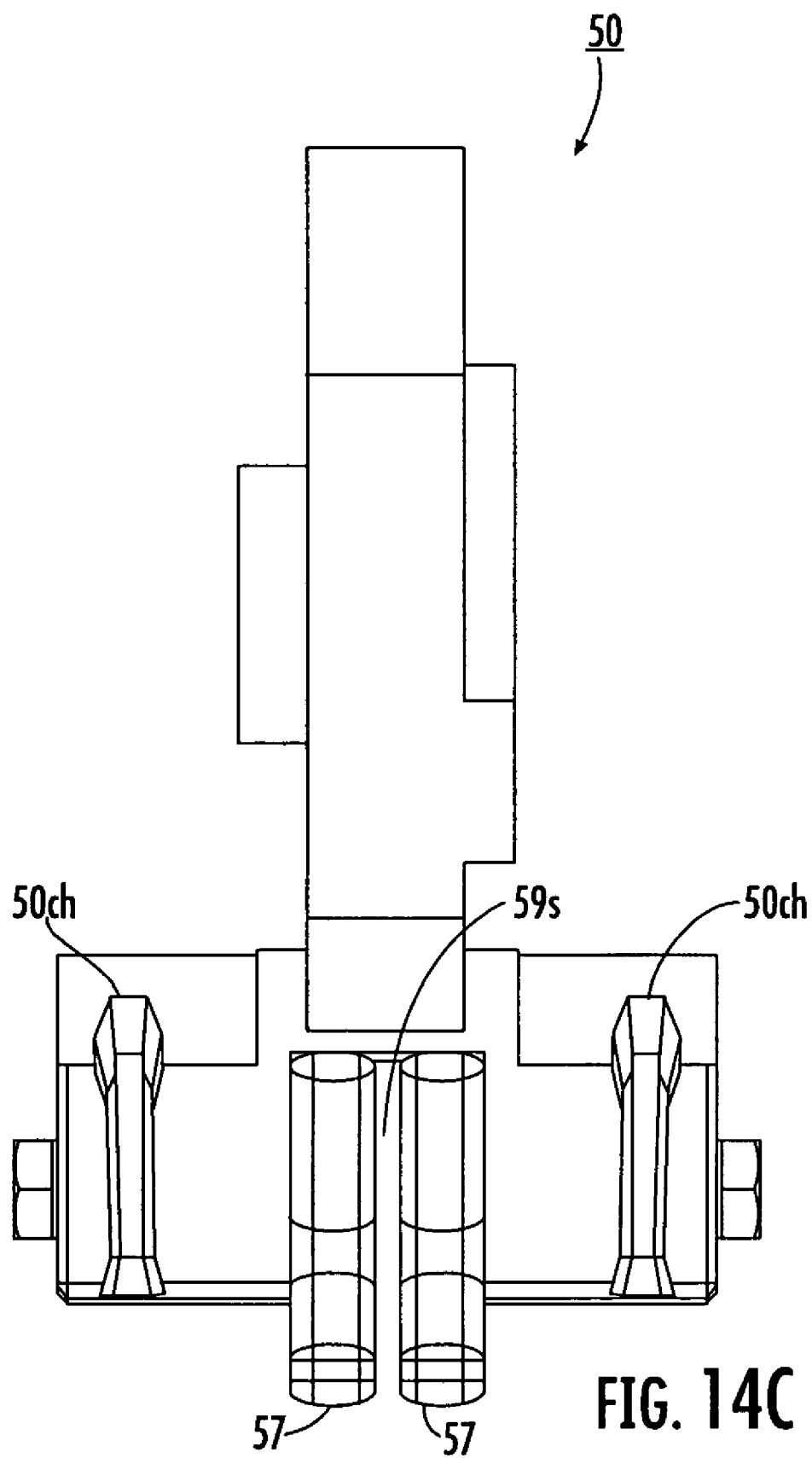
FIG. 14C is a rear view of a portion of the clipper shown in FIG. 14A according to embodiments of the present invention.

FIG. 14B illustrates that the clipper 50 can include a clipper gate 56 with gathering plates 57 thereon configured to help gather the netting and casing material into a suitably tight gathered rope form for clipping. FIG. 14C illustrates that the clipper 50 can have two spaced apart clip channels 50*ch* with the gathering plates 57 disposed intermediate thereof. The gathering plates 57 are spaced apart a distance sufficient to define a knife slot 59*s* configured to allow a knife 59 with an actuation cylinder 59*c* (FIG. 14B) that automatically extends and retracts the knife 59 through the knife slot 59*s* (FIG. 14B) to automatically sever the gathered material between the clipped package portions. Examples of suitable clips include metallic generally "U"-shaped clips available from Tipper Tie, Inc., in Apex, N.C. Other clips, clip materials and clip configurations may also be used. Examples of exemplary devices and apparatus used to void, clip or tension casing material are described in U.S. Pat. Nos. 4,847,953; 4,675,945; 5,074,386; 5,167,567; and 6,401,885, the contents of each of which are hereby incorporated by reference as if recited in full herein.

FIG. 15 illustrates one embodiment of a forming assembly 15. As shown, the forming assembly 15 includes a frame 15*f*, the casing roller support 18 (which may be releasably mounted to the frame 15*f* with bayonet style mounts), the netting chute mounting members 19, the forming collar 17 and the netting chute 30.

FIG. 16 illustrates that, in some embodiments, the forming assembly 15 may also include a derucker assembly 40. That is, the derucker assembly 40 may be configured to mount to the apparatus 10 and cooperate with the netting chute 30 and casing module 15 so that, during pumping, the derucker assembly 40 can automatically retract and extend to pull lengths of the sleeve material 30*s* in a downstream direction proximate the egress portion of the netting chute 30. The derucker assembly 40 can be in communication with a controller such as an HMI (Human Machine Interface) as will be discussed below. The derucker assembly 40 can also be configured to act as a braking assembly that pinches the netting against the chute 30 at desired intervals, such as during a voiding/clipping operation. The derucker assembly 40 can be configured to automatically switch between a derucker operation mode and braking operation mode.

Figure 21:
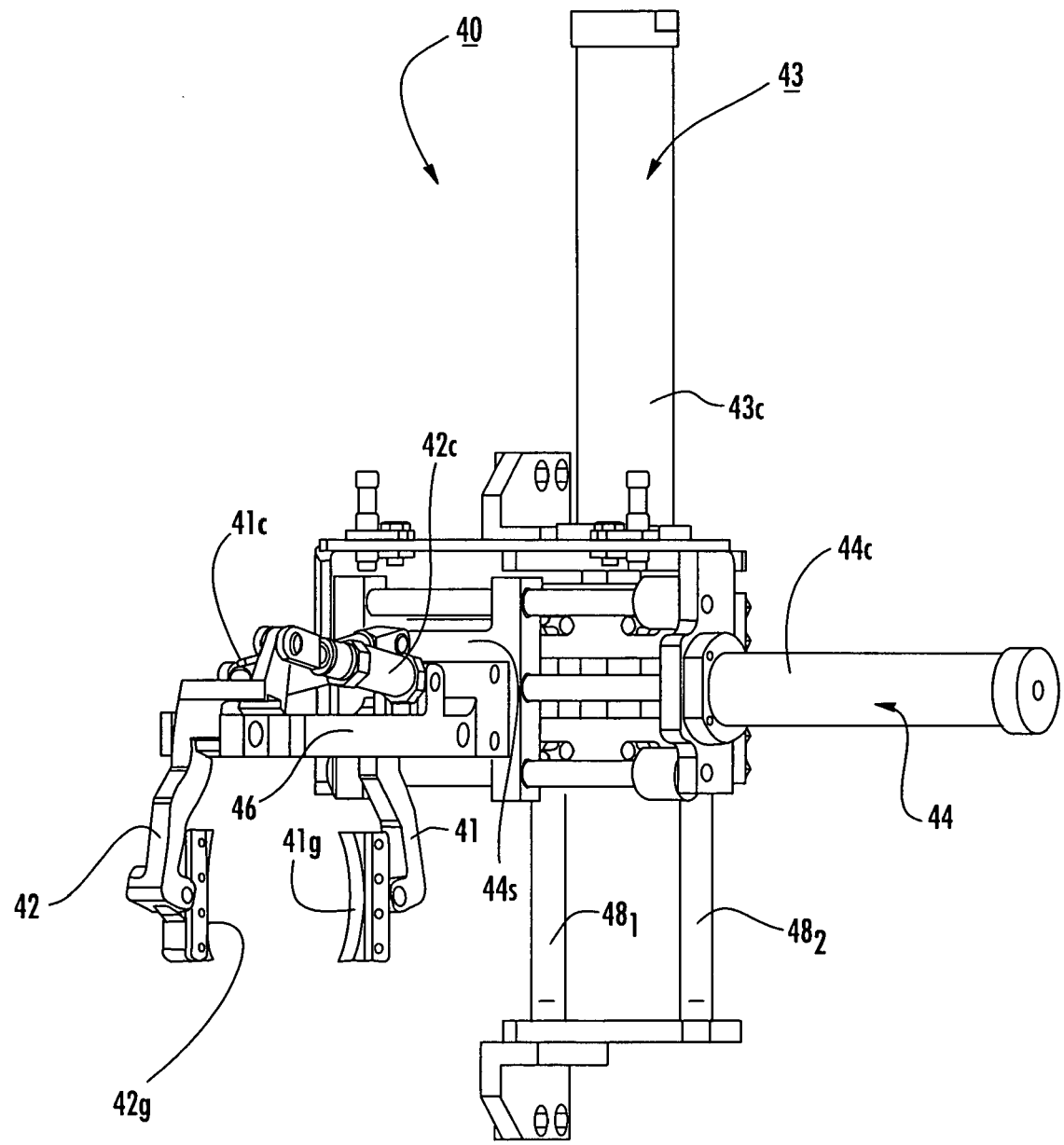
FIG. 21 is a perspective view of a derucker according to embodiments of the present invention.

As shown in FIGS. 16 and 21, the derucker assembly 40 (also called the "derucker") is configured to controllably move vertically (shown by arrow "V") and horizontally (shown by arrow "H") about slide assemblies 43 and 44, respectively. The derucker assembly 40 can be configured to releasably attach or mount to the frame 10*f* of the apparatus 10 (FIG. 1). As shown, the derucker assembly 40 includes a pair of arms 41, 42 that are configured to span the chute 30 and are configured to travel repeatedly and automatically through a derucker stroke cycle. The stroke cycle is configured so that the arms 41, 42 travel laterally toward each other to a contact configuration at a first location (that may be called a start position) whereby the arms 41, 42 engage, grip, pinch and/or grasp the netting with sufficient force on generally opposing side portions of the chute 30 so as to be able to pull or draw a segment of sleeve material downstream as the arms 41, 42 travel substantially in concert in the contact configuration to a second location (that can be called an end position) that is axially downstream of the first location. At the downstream second location, which is typically proximate the egress or discharge end portion of the chute 30, the arms 41, 42 travel laterally away from each other (and the chute 30) to release the netting, then travel in a non-contact configuration as they return to the first starting location whereby they can engage a second segment of netting. The arms 41, 42 can include grippers 41*g*, 42*g* that are configured to contact the netting on the chute 30. The grippers 41*g*, 42*g* can comprise an elastomeric and/or increased friction material. The derucking stroke cycle can provide a more uniform distribution of netting or tension in the netting proximate the discharge end of the chute 30 as the product is being pumped.

Figure 22:
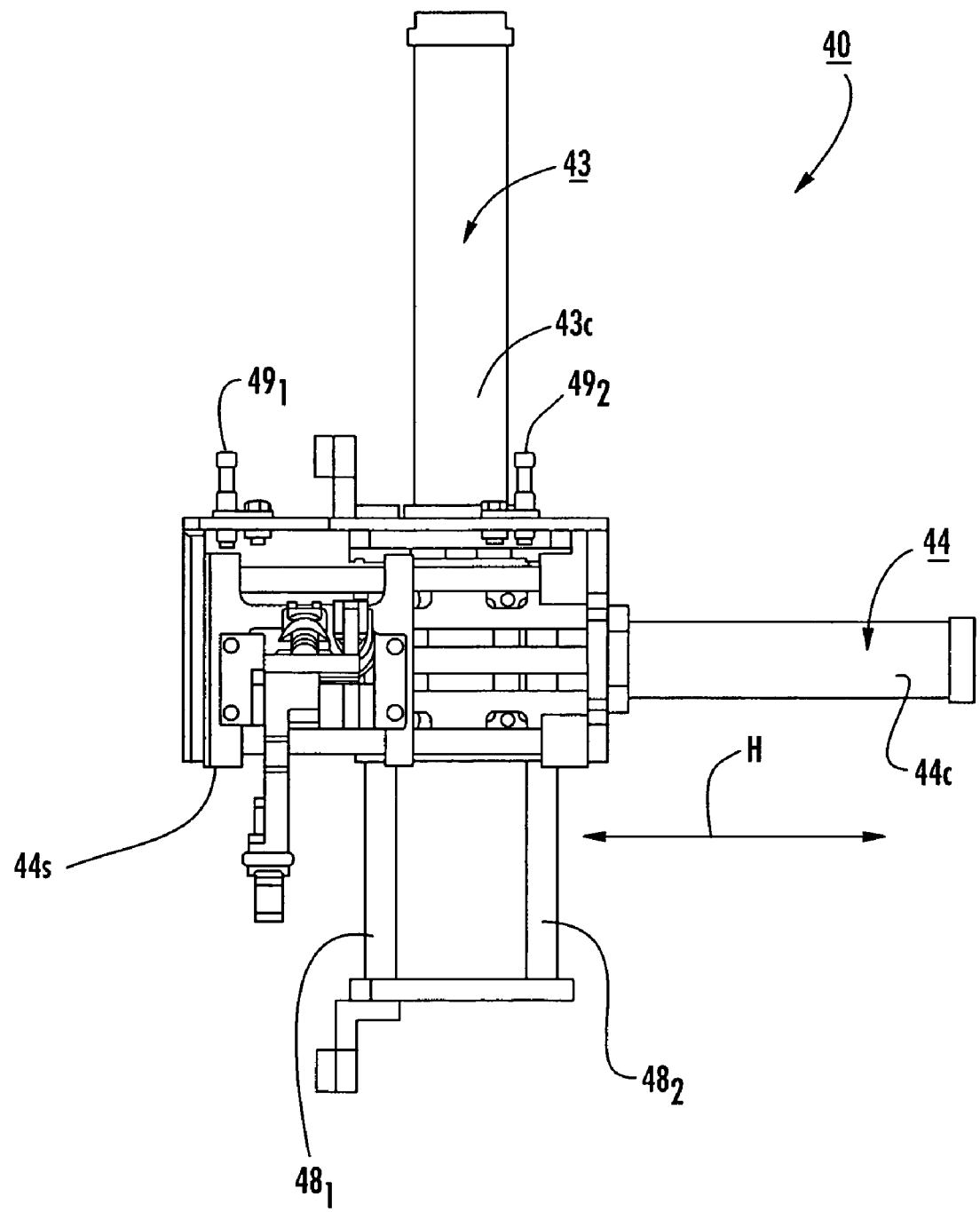
FIG. 22 is a front view of the derucker shown in FIG. 21.
Figure 23:
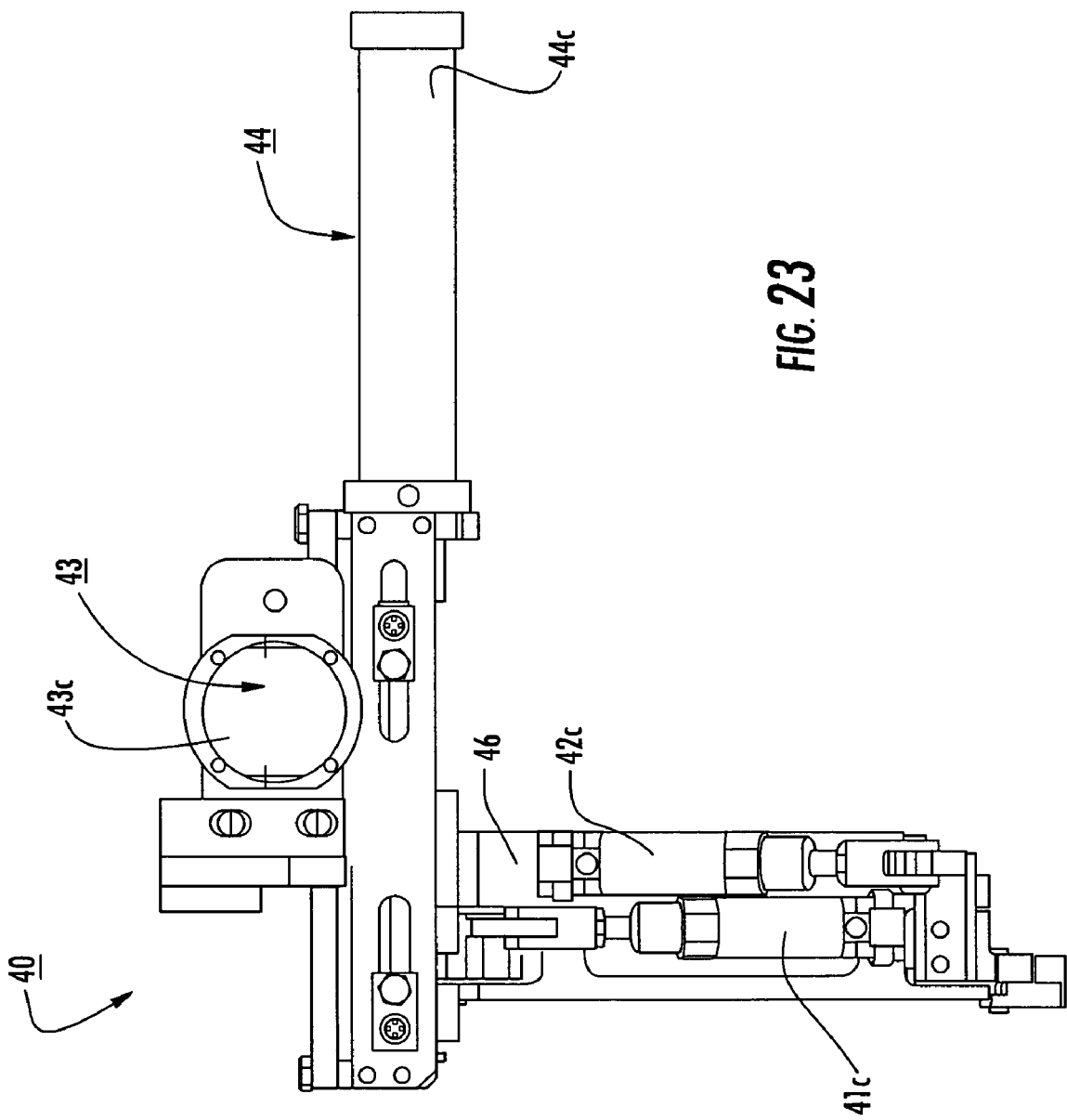
FIG. 23 is a top view of the derucker shown in FIG. 21.

FIGS. 16 and 21-24B illustrate that the derucker assembly 40 can include a vertical slide assembly 43 and a horizontal slide assembly 44. The arms 41, 42 can mount to the horizontal slide assembly 44 to reciprocally move the arms between the first and second locations during a derucking operational mode. The horizontal slide assembly 44 and arms 41, 42 can mount to the vertical slide assembly 43. As shown in FIGS. 21, 22 and 24A, the vertical slide assembly 43 can include a cylinder 43*c* and a vertical path defined by rods 481, 482. Referring to FIG. 16, in operation, the cylinder 43*c* rod drives the horizontal slide 44 up the vertical slide 43 so that the derucker assembly 40 is raised above and out of the way of the horn 20 to allow the chute 30 (and horn 20) to be pivoted in a generally horizontal plane out to a loading position. This facilitates the loading of elastic netting on the chute 30 and/or the loading of the chute 30 over the product horn 20 and the threading of the casing between the two horns 20, 30, respectively during start-up. The vertical movement can be manually carried out or automated.

Figure 24A:
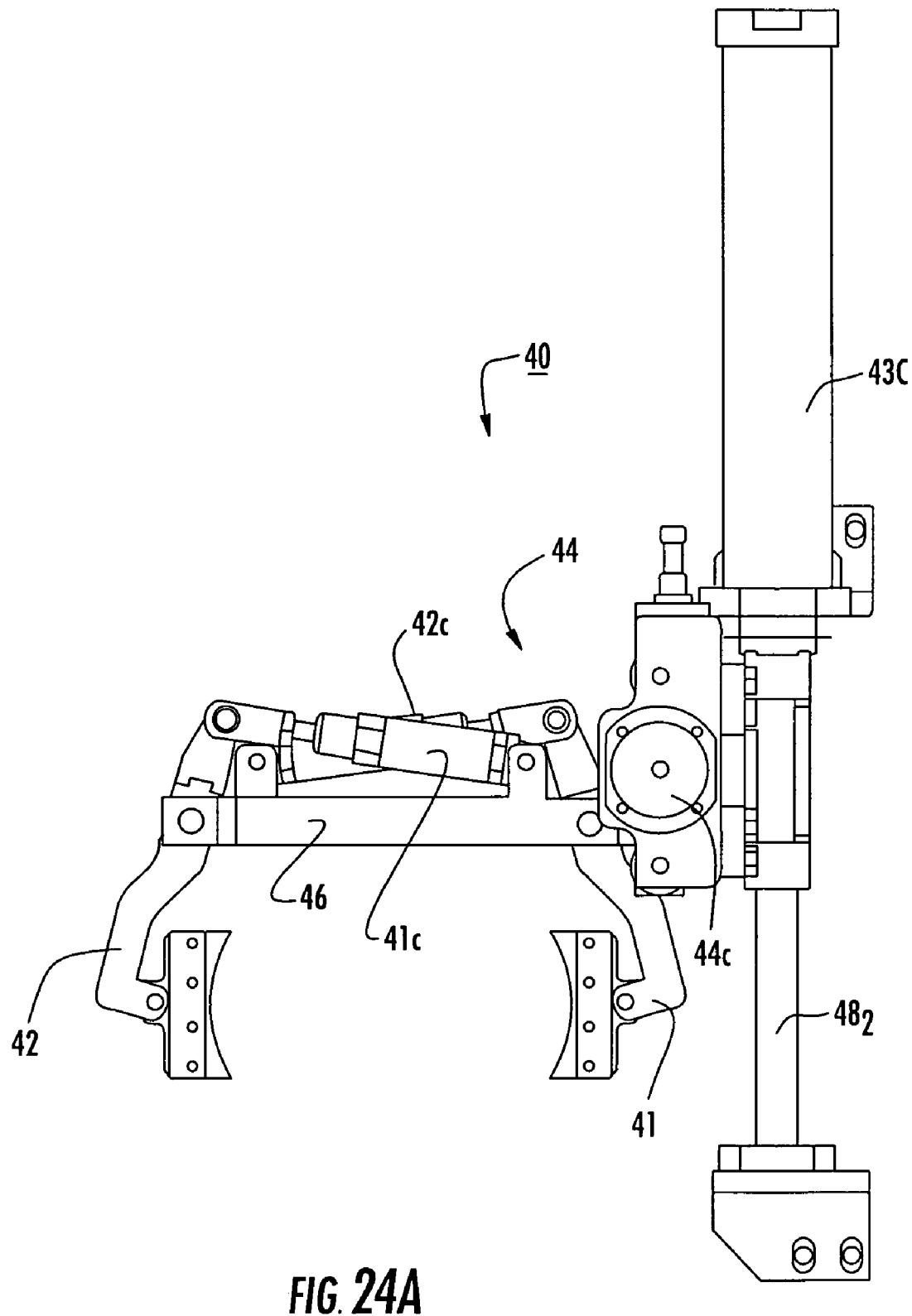
FIG. 24A is a right-hand view (looking downstream) of the derucker shown in FIG. 21.

FIGS. 16 and 21-24A show the horizontal assembly 44 that includes a cylinder 44*c* and a horizontal slide 44*s* (FIGS. 21 and 22). The arms 41, 42 and respective cylinders 41*c*, 42*c* extend out from the slide 44*s* and the cylinder 44*c* reciprocally moves the arms 41, 42 in the derucking mode. The arms 41, 42 are pivotably mounted to a sliding frame member 46 as shown in FIG. 24A to controllably pivot the arms 41, 42 and grippers 41*g*, 42*g* between closed and open configurations during the derucking stroke cycle. Referring to FIGS. 21 and 22, the horizontal slide 44*s* can be configured to define the generally horizontal travel path and axial stroke limits of the grippers 41*g*, 42*g*. The first and second locations of the derucker stroke cycle can be adjustable as well as the pressure, and frequency or speed of the stroke.

Once the horns 20, 30 are rotated into axial alignment and pumping position, along the product centerline of the apparatus, the vertical slide assembly 43 can lower the horizontal slide assembly 44 with arms 41, 42 to position the grippers 41*g*, 42*g* below an uppermost boundary or perimeter portion of the chute 30 to place the respective grippers 41*g*, 42*g* on generally opposing side portions of the chute 30. The horizontal slide assembly 44 then moves generally horizontally from the first (start) to the second (stop) location. As shown in FIG. 22, at least one proximity sensor 49 can be used to relay data regarding the position of the slide assembly 44 to automatically direct the grippers 41*g*, 42*g* to close against (or open away from) the chute 30. FIG. 22 illustrates two axially spaced apart sensors 491, 492, but one or more than two sensors may be used. The force of the grip can be adjusted via a pressure regulator that is configured to supply pressure to the gripper cylinders 41*c*, 42*c*.

In some embodiments, the derucking assembly 40 can also operate in a braking mode to apply a braking force to compress or pinch the netting proximate the discharge portion of the chute 30 during the clipping/voiding operation. The braking pressure may be greater than the derucking pressure applied by the grippers 41*g*, 42*g* and the arms 41, 42 can remain in a target static location for a desired braking interval. Typically the arms 41, 42 are directed to travel forward while open from the first location to a braking region, then close against the sides of the chute 30 for the desired braking interval. The braking mode may be automatically initiated in response to ceasing pumping and/or initiating a voiding operation.

Figure 24B:
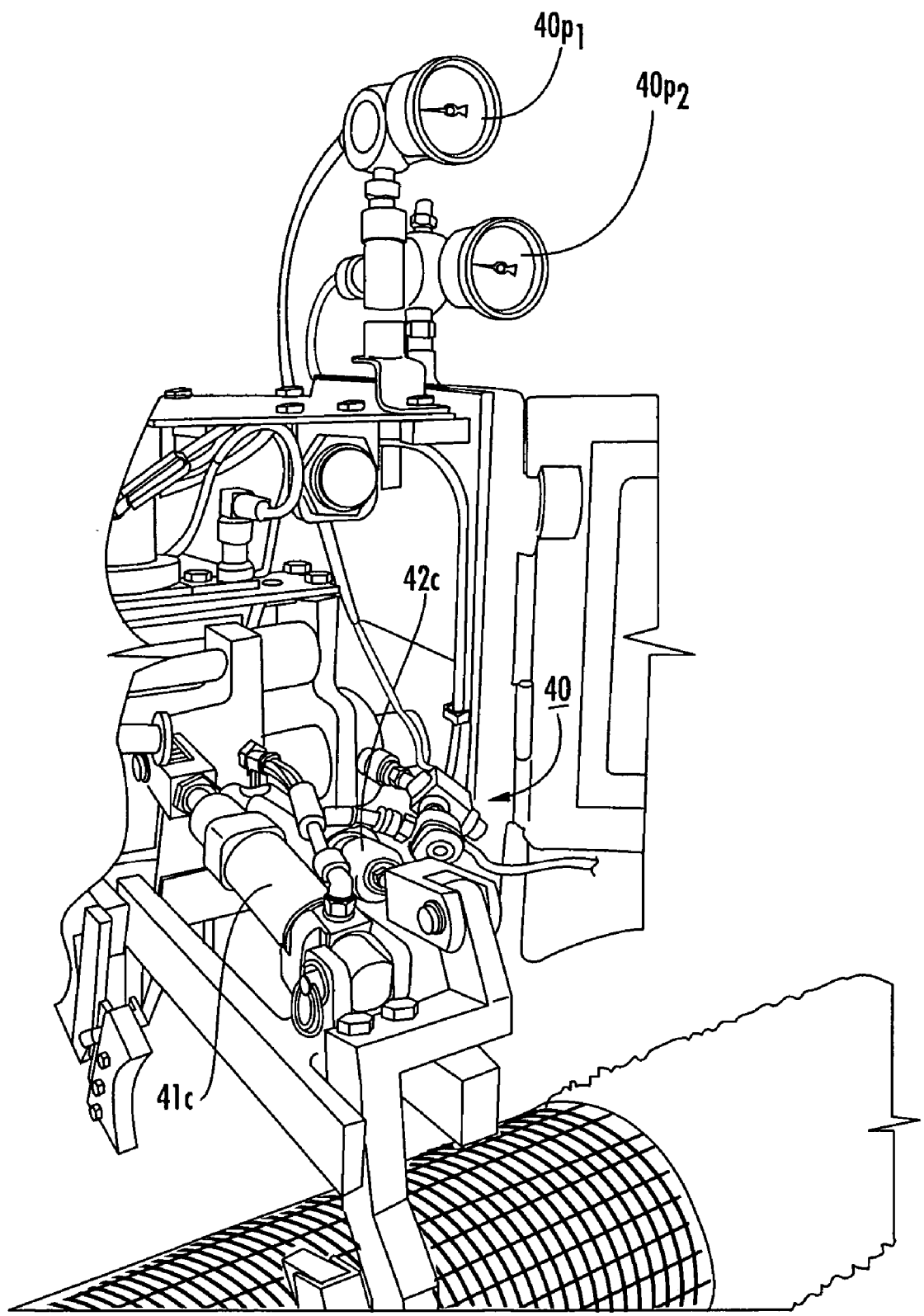
FIG. 24B illustrates the derucker shown in FIG. 24A with the derucker mounted to the apparatus and the housing guards open.

Referring to FIG. 24B, the derucker assembly 40 can include a derucking pressure regulator 40$p_1$ and a separate braking pressure regulator 40$p_2$ that are in communication with the gripper arm cylinders 41$c$, 42$c$ to control the pressure of a braking and derucker pressures applied by the grippers 41, 42. The pressures in the different braking and derucking modes can be automatically controlled with the gripper arms deployed to carry out the appropriate braking or derucker cycle operational mode. In other embodiments, a common pressure regulator can be used and different pressure regulation control means may be configured to apply the desired pressure to the grippers 41$g$, 42$g$.

The apparatus 10 can be configured to run generally automatically and continuously over a desired interval (typically between at least about 45-60 minutes, depending on the length of the roll stock and/or netting sleeve). In some embodiments, the apparatus can produce about 10-20, typically about 16, pieces of packaged product per minute (the packaged product typically averaging 3-6 lbs, but can vary).

Generally described, to initiate the edible casing operation, the horn 20 can be mounted to the frame 10$f$ (FIG. 1A), then laterally pivoted to the access or load configuration (FIG. 12). The roll stock 88 can be threaded over the horn 20 between the horn and chute 30 (FIGS. 11 and 13). The chute 30 is typically mounted to the frame 15$f$ after a length of the stock 88 is drawn off the spool 18 and pulled a distance downstream. The netting can be pre-rucked on the chute 30 so that some of the netting extends off the discharge portion of the chute 30 and the chute 30 and horn 20 can be rotated in concert to the axially aligned operative position (FIG. 8). The operator can manually draw the casing (such as formed collagen film) and netting through the voider plates 53 (FIGS. 8 and 14A). A priming quantity of product can be pumped through the horn 20 and excess fluid drained therefrom (which can be carried out prior to threading the casing as desired). The apparatus 10 can be cycled through a first (manually initiated) void and clip cycle that places two clips on the netting and casing. The gathered clipped netting can be cut apart between the two clips. This region between the two clips is sometimes described as the "tail" or end of the package. The first or forwardmost of the two clips forms the end of the forward (first) sealed product and the second or rearwardmost of the two clips forms the beginning of the next upstream package, which is now ready for filling which is restarted. Once the clipped gathered edge is on a downstream first clip side of a package (netting and casing), the apparatus is ready for automatic operation. The operator can select the automatic run mode (such as by pushing an automatic start button 25$b$, seen in FIG. 1A) to initiate the automatic operation of filling, voiding, and clipping.

The apparatus 10 can be configured to mount other horns and run different casing types, such as a heat seal horn and a shirred casing horn. Thus, the apparatus can be a multi-modal device that accepts at least two different horns, and typically at least three different horns as will be discussed further below, each operating using the same HMI 25 (FIG. 1A) and clipper/voider assembly to allow more manufacturing adaptivity. One horn that may be configured to provide casings can be one that processes a slug-type natural or artificial casing that unwinds, advances, stretches and/or pulls to form the elongate casing over the desired product. Another type of casing is a heat-sealed tubular elastomeric casing formed by seaming a thin sheet of flexible material, typically polymeric material, together.

For one of the interchangeable horn types, a typical shirred casing strand or chain lengths can be between about 1-6 feet. See, e.g., U.S. Pat. Nos. 3,543,378, 5,167,567, 5,067,313, and 5,181,302, the contents of which are hereby incorporated by reference as if recited in full herein. Examples of elastomeric tubular casing forming apparatus and an associated heat-sealing horn are described in U.S. Pat. Nos. 5,085,036 and 5,203,760, the contents of which are hereby incorporated by reference.

Figure 25:
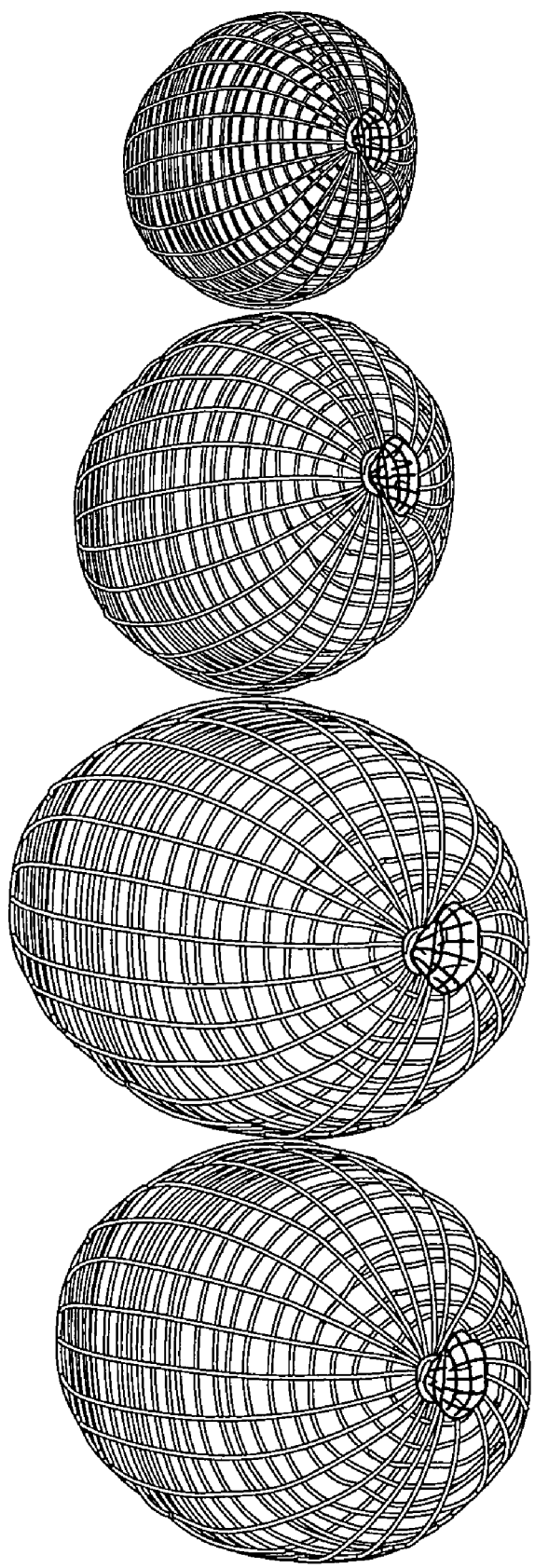
FIG. 25 is an illustration of exemplary bulbous products with different shapes that can be produced according to embodiments of the present invention.

Alternatively, the apparatus 10 can be configured as a single mode apparatus dedicated to shaping edible casing in situ while packaging the casing captured product in netting and gathering forward (leading) and/or rearward (trailing) package portions to define a clipped package product, such as those shown in FIG. 25.

Figure 26:
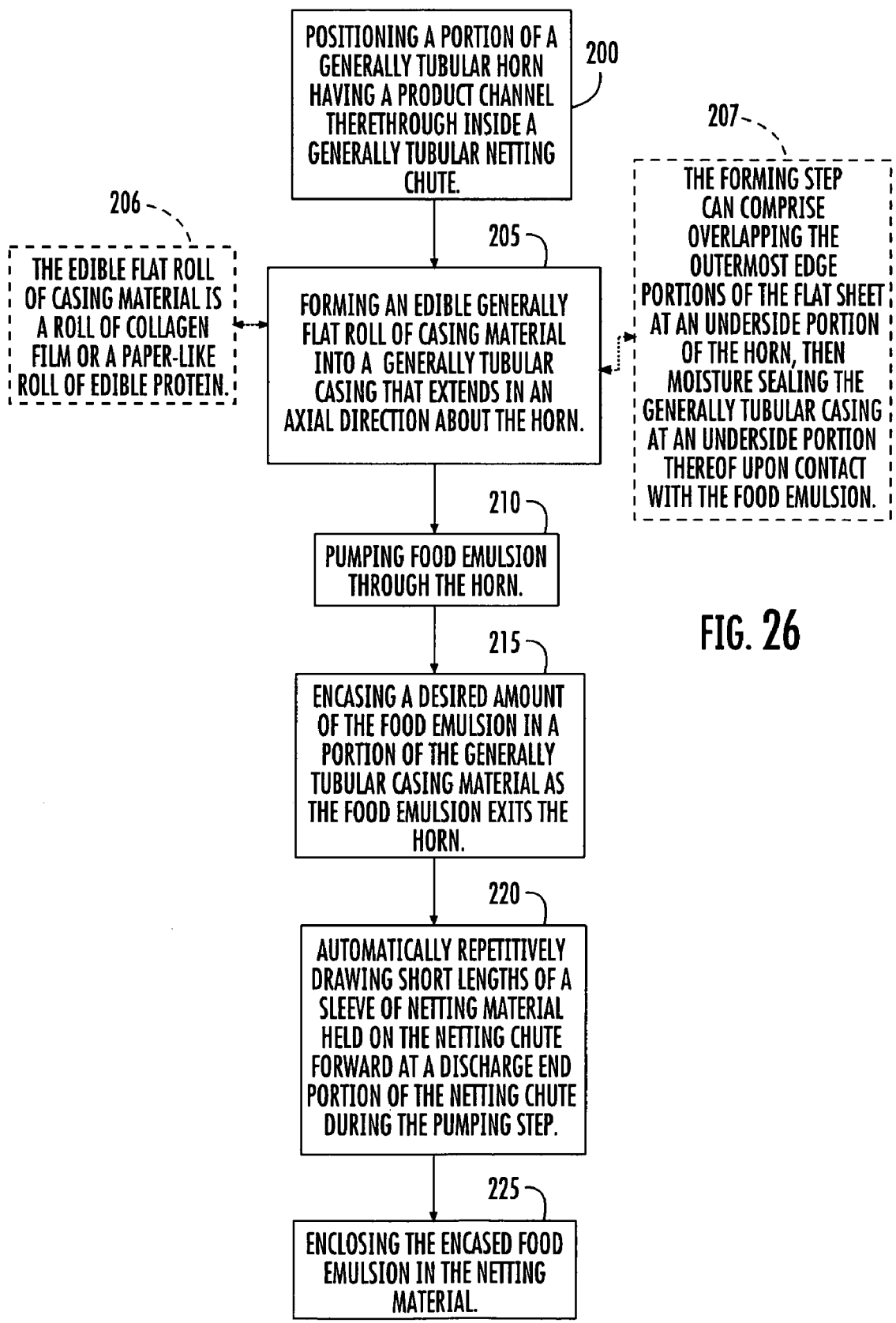
FIG. 26 is a flow chart of exemplary operations that may be carried out according to embodiments of the present invention.

FIG. 26 describes some operations that can be used to carry out certain embodiments of the present invention. A portion of a generally tubular horn is positioned inside a generally tubular netting chute (block 200). An edible, generally flat roll of casing material is formed into a generally tubular casing that extends in an axial direction about the horn (block 205). Food emulsion is pumped through the horn (block 210). A target amount of food emulsion is encased in the casing material as the food emulsion exits the horn (block 215). Short lengths of a sleeve of netting material held on the netting chute are repetitively automatically drawn downstream or forward toward a discharge end portion of the netting chute during the pumping step (block 220). The encased food emulsion is enclosed in the netting material (block 225). The food can be generally concurrently enclosed in the casing and the overlayer of netting as the food exits the horn.

The edible flat roll of casing material can be a roll of collagen film or a roll of a paper-like protein sheet (block 206). The forming step can comprise overlapping the outermost long edge portions of the flat sheet at an underside portion of the horn, then moisture sealing the generally tubular casing at an underside portion thereof upon contact with the food emulsion (block 207).

FIG. 27A shows a second horn assembly 20' releasably mounted to the apparatus 10. The second horn assembly 20' typically includes a forming shoulder on an upstream end portion that guides and/or shapes elastomeric roll stock (not shown) typically posited under the horn 20' and cooperates with a heat seal assembly to substantially conform to the shape of the tubular horn as the material travels away from the forming shoulder and hence wrap the elastomeric or other desired material around the horn 20'. FIG. 27B illustrates a third horn assembly 20" and related components mounted to the apparatus 10. As shown, the third horn assembly configuration 20" comprises serially connecting components including an intermediate pipe segment 22$p$ that can attach to a casing horn 22$h$. The third horn assembly 20" is typically configured to run with different casing (non-seamed or slugs) materials such as shirred fibrous casings placed over the casing horn 22$h$. The clipper 50 is typically disposed downstream of the horns 20', 22$h$ and is illustrated schematically in FIGS. 27A and 27B. Additional description of the horn assemblies 20', 20" and the apparatus 10 can be found in co-assigned U.S. patent application Ser. No. 10/729,282, the contents of which is incorporated by reference as if recited in full herein.

Figure 28:
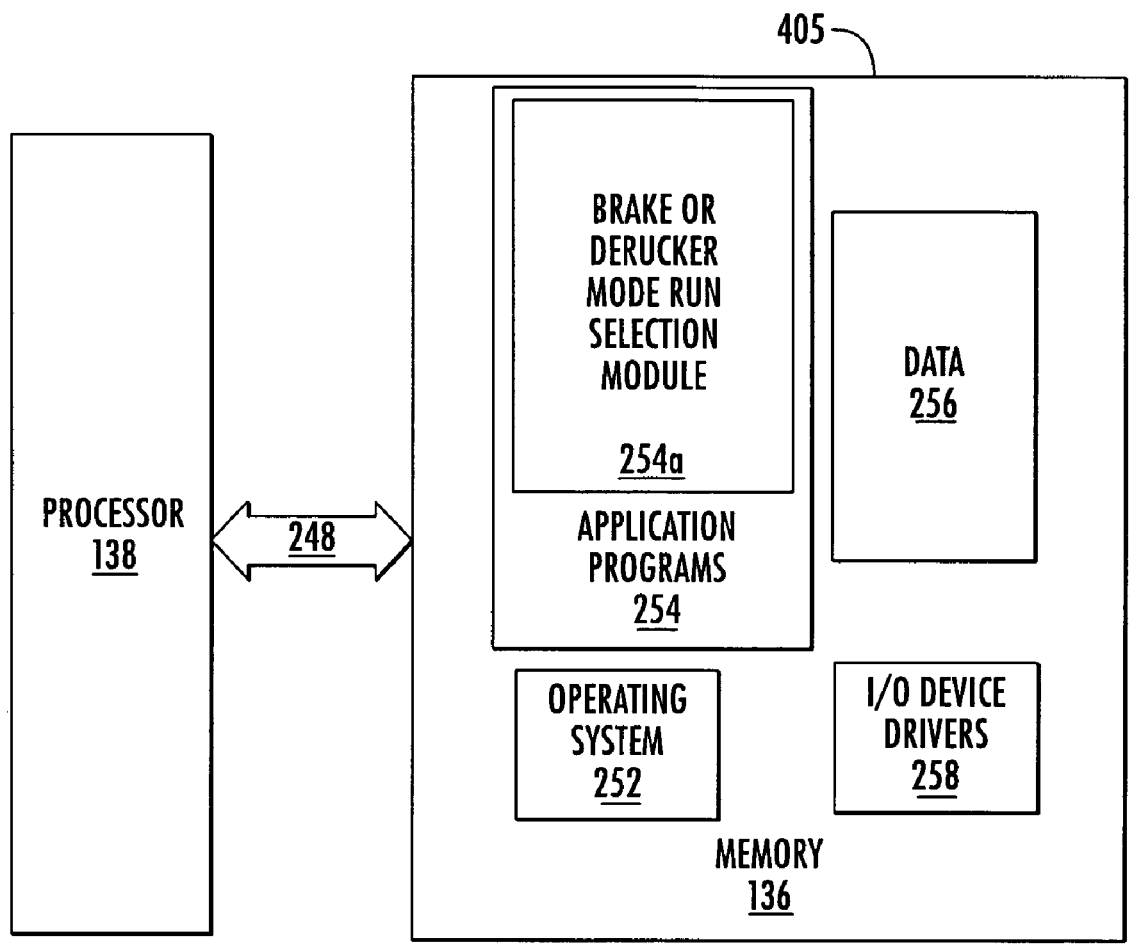
FIGS. 28-30 are block diagrams of data processing systems according to embodiments of the present invention.
Figure 29:
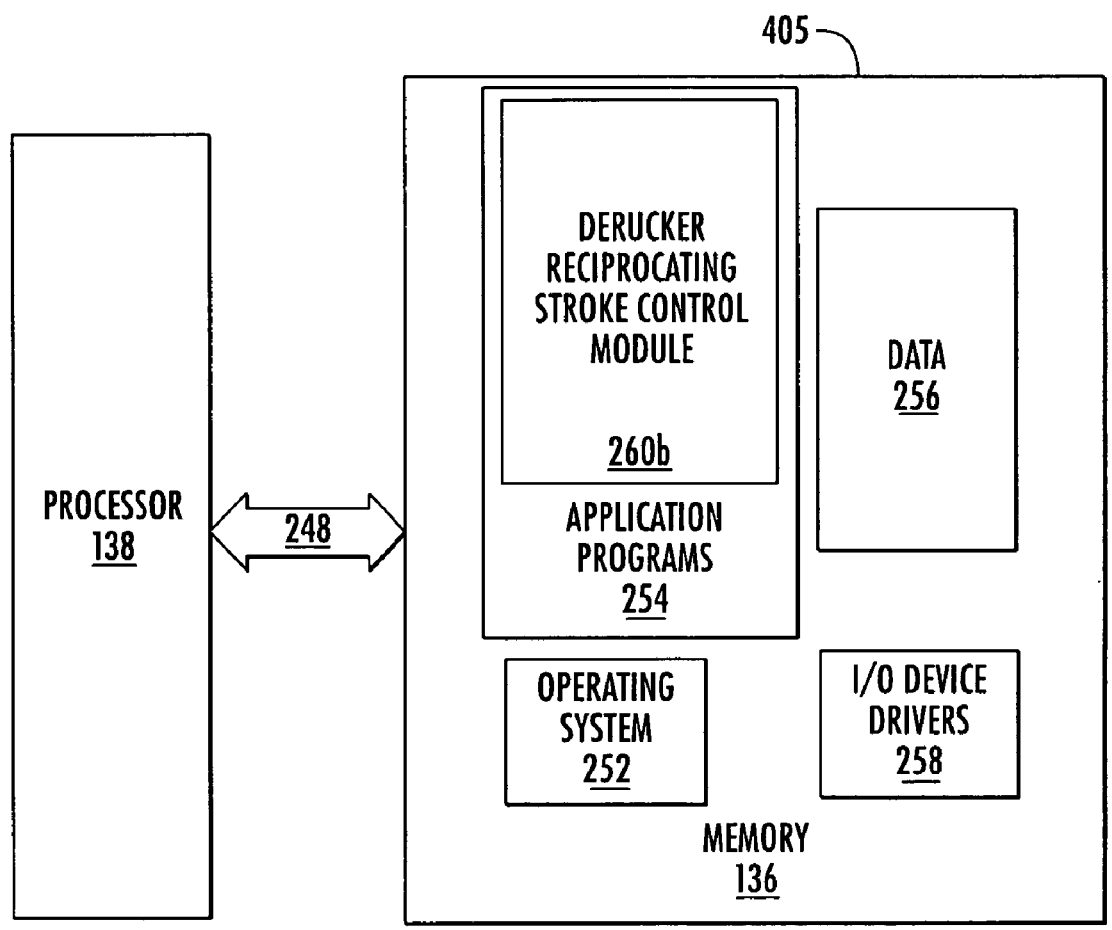
Figure 30:
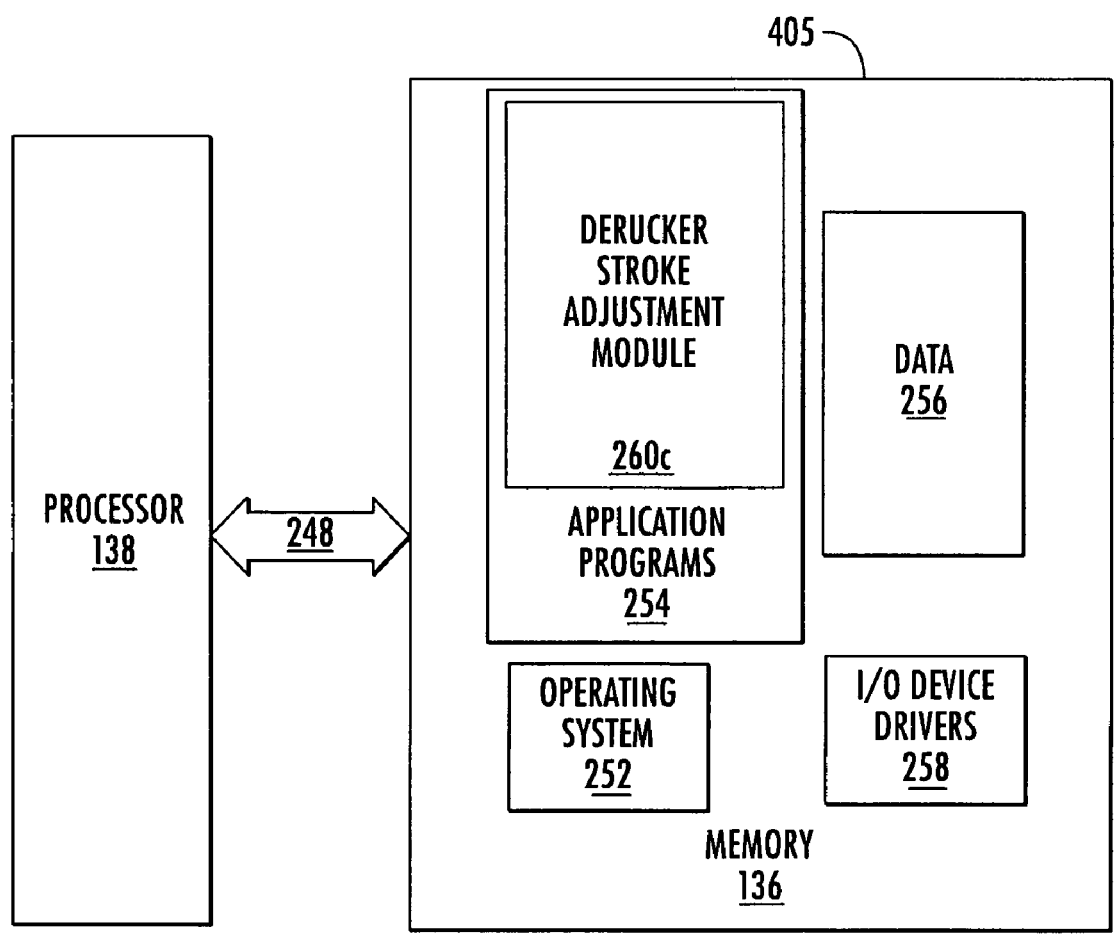

FIGS. 28-30 are block diagrams of exemplary embodiments of data processing systems that illustrate systems, methods, and/or computer program products in accordance with embodiments of the present invention. The operation and sequence of events can be controlled by a programmable logic controller. The operational mode or certain input features can be selected by an operator input using a Human Machine Interface (HMI) to communicate with the controller as is well known to those of skill in the art.

The processor 138 communicates with the memory 136 via an address/data bus 248. The processor 138 can be any commercially available or custom microprocessor. The memory 136 is representative of the overall hierarchy of memory devices containing the software and data used to implement the functionality of the data processing system 405. The memory 136 can include, but is not limited to, the following types of devices: cache, ROM, PROM, EPROM, EEPROM, flash memory, SRAM, and DRAM.

As shown in FIGS. 28-30, the memory 136 may include several categories of software and data used in the data processing system 405: the operating system 252; the application programs 254; the input/output (I/O) device drivers 258; and the data 256. The memory may also include one or more of a Brake or Derucker Mode Run Selection Module 260a (FIG. 28), a Derucker Reciprocating Stroke Control Module 260b (FIG. 29), and/or a Derucker Stroke Adjustment Module 260c (FIG. 30). The modules can be automatic or configured to accept user input to select the operational sequence associated with the casing and/or horn type in use and/or to control certain operations of the components for automatic or semi-automatic operation. For example, one or more of the modules 260a, 260b, and 260c can accept proximity sensor data, pumping status, clipper status and the like.

In some embodiments, the module 260c is configured to allow a user to select certain parameters associated with a desired derucking stroke cycle. For example, a user can select a desired repetition frequency (speed), repetition cycles per sleeve and/or per product, gripper contact force, stroke distance, and the like.

The data 256 may include a look-up chart of different casing run times (i.e., for a type of netting or edible casing formed in situ, as well as the product, the product filling rate, selectable product weight, length and the like corresponding to particular or target products for one or more producers. The data 256 may include data from a proximity sensor and/or exhaustion of casing or netting material detector that allows the computer program to automatically control the operation of the pumping apparatus to inhibit discharging product when casing material has been expended or during a clipping cycle.

As will be appreciated by those of skill in the art, the operating system 252 may be any operating system suitable for use with a data processing system, such as OS/2, AIX, DOS, OS/390 or System390 from International Business Machines Corporation, Armonk, N.Y., Windows CE, Windows NT, Windows95, Windows98 or Windows2000 from Microsoft Corporation, Redmond, Wash., Unix or Linux or FreeBSD, Palm OS from Palm, Inc., Mac OS from Apple Computer, LabView, or proprietary operating systems. The I/O device drivers 258 typically include software routines accessed through the operating system 252 by the application programs 254 to communicate with devices such as I/O data port(s), data storage 256 and certain memory 136 components. The application programs 254 are illustrative of the programs that implement the various features of the data processing system 405 and preferably include at least one application which supports operations according to embodiments of the present invention. Finally, the data 256 represents the static and dynamic data used by the application programs 254, the operating system 252, the I/O device drivers 258, and other software programs that may reside in the memory 136.

While the present invention is illustrated, for example, with reference to the Modules 260a, 260b, 260c being an application program in FIGS. 28-30, as will be appreciated by those of skill in the art, other configurations may also be utilized while still benefiting from the teachings of the present invention. For example, the Modules 260a, 260b, 260c may also be incorporated into the operating system 252, the I/O device drivers 258 or other such logical division of the data processing system 405. Thus, the present invention should not be construed as limited to the configurations of FIGS. 28-30, which are intended to encompass any configuration capable of carrying out the operations described herein.

The I/O data port can be used to transfer information between the data processing system 405 and certain components associated with the apparatus or mounted to the apparatus, which may use data from the HMI. The apparatus may have a common HMI or different controllers and the system 405 can communicate with same, such as a controller associated with the voiding/clipping or closure attachment mechanism or another computer system or a network (e.g., the Internet) or to other devices controlled by the processor. These components may be conventional components such as those used in many conventional data processing systems which may be configured in accordance with the present invention to operate as described herein.

For example, the data processing system can be a computer program product with computer readable program code configured to provide a plurality of different predetermined operational modes of an apparatus that releaseably mounts different horn configurations to supply different casings and a flowable product and computer readable program code configured to select one of the predetermined operational modes responsive to whether a first horn with a first casing material or a second casing horn with a second casing material different from the first casing material is in communication with the apparatus.

In particular embodiments, the computer readable program code is configured to accept user input to identify the type of casing material selected for deployment and/or a selection of the operational mode with either the first or second horn. In addition, the computer readable program code can be configured to inhibit operation until the desired horn is in proper operative position and or to actuate the latch cylinder for the horn rotor mechanism. In certain embodiments, the computer readable program code that inhibits operation comprises computer readable program code configured to obtain and analyze data from a proximity sensor positioned to automatically detect when the horn is in an operative horizontally aligned position.

In addition, the computer readable program code can be configured to automatically identify when a casing supply on the forming assembly is exhausted. For example, the computer readable program code can be configured to monitor and/or detect when a limit switch is triggered responsive to force applied to a lead attached to a trailing edge portion of the supply of casing material or netting as the trailing edge portion advances.

In certain embodiments, the computer program can include computer readable program code configure to supply sheet roll stock to the first horn and form the roll stock into a tubular casing configuration in situ and/or computer readable program code that allows a manual stop and start to interrupt product flow to feed serially positioned slugs of fibrous casing material on the second horn. In addition, the computer program can include program code configured to control product flow from a pump positioned upstream of the apparatus to direct the product to flow through one of the first horn or second horn, responsive to which is installed in communication with the apparatus. In particular embodiments, the program can include program code that automatically identifies the desired operational mode by detecting which horn is in position on the apparatus.

While the present invention is illustrated, for example, with reference to particular divisions of programs, functions and memories, the present invention should not be construed as limited to such logical divisions. Thus, the present invention should not be construed as limited to the configurations of FIGS. 28-30 but is intended to encompass any configuration capable of carrying out the operations described herein.

The flowcharts and block diagrams of certain of the figures herein illustrate the architecture, functionality, and operation of possible implementations of selective implementation of single and dual clip closure means according to the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, where used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method for producing encased products, comprising:
   positioning a portion of a generally tubular horn having a product channel therethrough inside a generally tubular netting chute;
   forming an edible and/or dissolvable generally flat roll of casing material into a generally tubular casing that extends in an axial direction about the horn;
   pumping food emulsion through the horn;
   encasing a desired amount of the food emulsion in a portion of the generally tubular casing material as the food emulsion exits the horn;
   automatically electronically controlling activation and movement of a mechanism for repeatedly drawing defined short lengths of a sleeve of netting material held on the netting chute forward at a discharge end portion of the netting chute during the pumping step;
   automatically electronically controlling activation and movement of a mechanism for braking the netting material proximate the discharge end portion of the netting chute after the drawing step;
   enclosing the encased food emulsion in the netting material; and
   automatically shaping a series of netting enclosed encased food emulsion products to a desired consistent shape based at least in part on the drawing, braking and pumping steps.

2. A method according to claim 1, wherein the netting is elastic netting, wherein the discharge end of the horn terminates proximate the discharge end of the netting chute, and wherein the method further comprises:
   pulling the generally tubular casing material downstream over the horn in an axially extending circumferential gap space defined by the configurations and positions of the horn and the netting chute during the pumping step;
   the drawing step is carried out so that the netting is pulled downstream over the netting chute in concert with the pulling of the casing material so that the netting holds the casing material therein as food emulsion is discharged from the horn during the pumping step; and
   stretching the elastic netting in at least two dimensions to form a bulbous product in response to the pumping and pulling steps.

3. A method according to claim 1, further comprising automatically voiding, then automatically clipping, at least one end portion of the netting and casing after the enclosing step.

4. A method according to claim 3, further comprising severing the netting and casing proximate the clipped portion to provide a discrete netting encased product.

5. A method according to claim 4, further comprising conveying the netting encased food emulsion downstream of the horn and netting chute.

6. A method according to claim 1, wherein the edible flat roll of casing material is a roll of collagen film.

7. A method according to claim 1, wherein the flat roll of casing material is a dissolvable sheet of protein.

8. A method according to claim 7, further comprising spraying the protein sheet with liquid during the forming step.

9. A method according to claim 8, wherein the forming step comprises unrolling the sheet and directing the sheet to form into a generally tubular shape while being pulled downstream over a forming collar that extends about a portion of the horn that is upstream of the netting chute.

10. A method according to claim 9, wherein the spraying step comprises spraying water onto the sheet proximate and before the sheet enters the forming collar.

11. A method according to claim 10, wherein the spraying step comprises employing a spray bar with a plurality of spaced apart spray nozzles thereon spaced to cover at least a major portion of the width of the sheet and spraying water during the forming step.

12. A method according to claim 1, wherein the horn and the netting chute are substantially concentric.

13. A method according to claim 1, wherein the forming step comprises overlapping the outermost edge portions of the flat sheet at an underside portion of the horn, the method further comprising moisture-sealing the generally tubular casing at an underside portion thereof upon contact with the food emulsion.

14. A method according to claim 1, wherein the mechanism used for the braking step and the mechanism used for the drawing step is the same mechanism, a derucker device, and wherein gripping members associated with the derucker device have a braking pressure in the braking step and a drawing pressure in the drawing step, wherein the braking pressure is larger than the drawing pressure, and wherein the method further comprises automatically adjusting the pressure to carry out the drawing and braking steps.

15. A method according to claim 14, wherein the derucker device comprises a pair of arms that are configured to contact opposing sides of the netting chute during the drawing and braking steps.

16. A method according to claim 15, wherein the arms of the derucker device travel in concert during a derucker closed perimeter stroke cycle whereby the arms move between upstream and downstream positions, and wherein the arms contact the netting on the netting chute during the movement downstream to draw short lengths of the netting toward the end of the netting chute but are spaced apart from the netting and the netting chute during upstream movement.

17. A method according to claim 16, further comprising lifting the derucker arms above the netting chute and horn before pivoting the horn to a service position that is laterally offset from the axially aligned operative orientation.

18. A method according to claim 14, wherein the braking step positions the derucker device at a forward netting chute location so that the gripping members remain in a static location during the braking step to pinch the netting against the netting chute, and wherein the drawing step causes the derucker device to move the gripping members to close against the chute, then move along a length of the chute in a downstream direction, then move away from the chute for deruck cycle thereby drawing a length of netting from an upstream location on the chute to a downstream location on the chute, and repeating this deruck cycle at least once during the shaping step of one product.

19. A method according to claim 1, wherein the method further comprises selecting either collagen film or protein sheet roll stock as the edible casing.

20. A method according to claim 1, the method further comprising automatically timing the drawing step so that the mechanism travels a length of the netting chute to pull a length of the netting during the pumping step.

21. A method according to claim 1, wherein the braking step is automatically initiated in response to cessation of the pumping step and/or initiating of voiding the casing before a clipping operation.

22. A method according to claim 1, further comprising receiving the encased netting enclosed product on a conveyor positioned downstream of the netting chute and transporting the enclosed product on the conveyor at a conveying speed away from the netting chute, wherein the automatically shaping step is carried out based on the conveying speed, pump speed, netting size and netting elasticity.

23. A method according to claim 1, further comprising providing a user selectable electronic menu of different operational modes for different horn types and/or different product types which has: (a) defined associated pump speeds and (b) defined derucker stroke parameters for the mechanism used to carry out the drawing step.

24. A method according to claim 1, further comprising electronically accepting user input to select a plurality of a desired stroke distance, stroke speed, and/or frequency of a derucker stroke cycle of the mechanism used to carry out the drawing step.

25. A method according to claim 24, wherein the accepting electronic user input is configured to allow a user to select a gripping contact force and/or pressure of grippers associated with the mechanism used to carry out the drawing step.

26. A method according to claim 1, wherein the mechanism used for the drawing step is a derucker with a reciprocating stroke cycle and a pair of gripping members that deruck a defined number of times during a pumping cycle for each product of like type, and wherein the mechanism used for the braking step is the derucker which deploys the gripping members with a braking pressure that is greater than a pressure used during the derucks, and wherein the braking pressure is controlled to be consistent from one piece to the next for products of like type.

27. A method for producing encased products, comprising:
    positioning a portion of a generally tubular horn having a product channel therethrough inside a generally tubular netting chute;
    forming an edible and/or dissolvable generally flat roll of casing material into a generally tubular casing that extends in an axial direction about the horn;
    pumping food emulsion through the horn at a pumping speed;
    serially encasing a desired amount of the food emulsion in different portions of the generally tubular casing material as the food emulsion exits the horn;
    automatically derucking netting from the netting chute during the pumping step using a derucker with a pair of gripping members having a reciprocating stroke cycle including having a forward stroke length whereby the gripping members contact the netting chute with netting held between the derucker gripping members and the chute at a derucker pressure for repeatedly drawing defined lengths of a sleeve of netting material held on the netting chute forward at a discharge end portion of the netting chute during the pumping step;
    automatically braking the netting material proximate the discharge end portion of the netting chute after the derucking step using the derucker by closing the gripping members against the chute with a braking pressure larger than the derucking pressure;
    enclosing the encased food emulsion in the netting material; and
    automatically shaping a series of netting enclosed encased food emulsion products to a desired consistent shape based at least in part on the derucking, braking and pumping steps.

* * * * *